(12) United States Patent
Desai et al.

(10) Patent No.: US 11,914,440 B2
(45) Date of Patent: Feb. 27, 2024

(54) PROTOCOL LEVEL CONTROL FOR SYSTEM ON A CHIP (SOC) AGENT RESET AND POWER MANAGEMENT

(71) Applicant: Google LLC, Mountain View, CA (US)

(72) Inventors: Shailendra Desai, Ahmedabad (IN); Mark Pearce, San Francisco, CA (US); Amit Jain, Ahmedabad (IN); Jaymin Patel, Ahmedabad (IN)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/656,378

(22) Filed: Mar. 24, 2022

(65) Prior Publication Data
US 2022/0214731 A1 Jul. 7, 2022

Related U.S. Application Data

(63) Continuation of application No. 16/368,443, filed on Mar. 28, 2019, now Pat. No. 11,340,671.
(Continued)

(51) Int. Cl.
G06F 1/24 (2006.01)
G06F 1/32 (2019.01)
G06F 15/78 (2006.01)
G06F 1/324 (2019.01)
G06F 1/3234 (2019.01)
(Continued)

(52) U.S. Cl.
CPC ............ *G06F 1/24* (2013.01); *G06F 1/324* (2013.01); *G06F 1/3243* (2013.01); *G06F 9/542* (2013.01); *G06F 11/1402* (2013.01); *G06F 15/7807* (2013.01); *G06N 5/043* (2013.01); *H04L 9/085* (2013.01)

(58) Field of Classification Search
CPC .......... G06F 1/24; G06F 1/324; G06F 1/3243; G06F 15/7807
See application file for complete search history.

(56) References Cited

U.S. PATENT DOCUMENTS 6,604,159 B1 8/2003 Thekkath et al.
6,654,896 B1 11/2003 Saunders et al.
(Continued)

FOREIGN PATENT DOCUMENTS

EP 2761386 8/2014
JP 2007115252 5/2007
(Continued)

OTHER PUBLICATIONS

"Final Office Action", U.S. Appl. No. 16/368,392, dated Mar. 28, 2022, 18 pages.
(Continued)

*Primary Examiner* — Jaweed A Abbaszadeh
*Assistant Examiner* — Cheri L Harrington
(74) *Attorney, Agent, or Firm* — Colby Nipper PLLC

(57) ABSTRACT

A system for consistently implementing reset and power management of IP agents on a System on a Chip (SoC). When IP agents undergo a reset, an individual negotiation takes placed between an interconnect and each IP agent over a link. Each IP agent can emerge from reset at its own time schedule, independently of the timing of the other IP agents. The interconnect may be configured as a proxy for any IP agent that is inoperable, including prior to reset, when in a power-down mode, or malfunctioning.

20 Claims, 18 Drawing Sheets

Related U.S. Application Data

(60) Provisional application No. 62/691,117, filed on Jun. 28, 2018, provisional application No. 62/650,589, filed on Mar. 30, 2018.

(51) Int. Cl.
    *G06F 9/54*      (2006.01)
    *G06F 11/14*      (2006.01)
    *G06N 5/043*      (2023.01)
    *H04L 9/08*      (2006.01)

(56) References Cited

U.S. PATENT DOCUMENTS

| | | |
|---|---|---|
| 6,678,767 B1 | 1/2004 | Cho et al. |
| 6,707,817 B1 | 3/2004 | Kadambi et al. |
| 6,829,666 B1 | 12/2004 | Deneroff et al. |
| 6,976,134 B1 | 12/2005 | Lolayekar et al. |
| 7,174,467 B1 | 2/2007 | Helms et al. |
| 7,260,688 B1 | 8/2007 | Baxter et al. |
| 7,577,857 B1 | 8/2009 | Henderson et al. |
| 7,587,525 B2 | 9/2009 | Dahan et al. |
| 7,664,018 B2 | 2/2010 | Warren et al. |
| 7,912,075 B1 | 3/2011 | Holland et al. |
| 8,448,001 B1 | 5/2013 | Zhu et al. |
| 8,711,867 B2 | 4/2014 | Guo et al. |
| 9,489,028 B2 | 11/2016 | Khor et al. |
| 9,514,074 B2 | 12/2016 | Jeloka et al. |
| 9,727,114 B2 | 8/2017 | Malmberg et al. |
| 9,733,689 B2 | 8/2017 | Muralidhar et al. |
| 9,781,058 B1 | 10/2017 | Addepalli et al. |
| 10,452,124 B2 | 10/2019 | Bauman et al. |
| 10,585,825 B2 | 3/2020 | Desai et al. |
| 10,621,128 B2 | 4/2020 | Brown et al. |
| 10,642,341 B2 | 5/2020 | Srinivasan et al. |
| 10,725,955 B2 | 7/2020 | Brown |
| 10,739,836 B2 | 8/2020 | Pappu et al. |
| 10,838,891 B2 | 11/2020 | Desai et al. |
| 10,853,282 B2 | 12/2020 | Desai et al. |
| 11,003,604 B2 | 5/2021 | Desai et al. |
| 11,340,671 B2 | 5/2022 | Desai et al. |
| 11,640,362 B2 | 5/2023 | Desai et al. |
| 2002/0196778 A1 | 12/2002 | Colmant et al. |
| 2005/0131666 A1 | 6/2005 | Tsai et al. |
| 2006/0212632 A1 | 9/2006 | Apostol et al. |
| 2006/0248318 A1 | 11/2006 | Zohner et al. |
| 2007/0130344 A1 | 6/2007 | Pepper |
| 2009/0245257 A1 | 10/2009 | Comparan et al. |
| 2010/0158005 A1 | 6/2010 | Mukhopadhyay et al. |
| 2010/0198972 A1 | 8/2010 | Umbehocker |
| 2010/0330927 A1 | 12/2010 | Cherukuri et al. |
| 2011/0022754 A1 | 1/2011 | Cidon et al. |
| 2011/0296216 A1 | 12/2011 | Looi et al. |
| 2011/0296222 A1 | 12/2011 | Tan et al. |
| 2011/0302336 A1 | 12/2011 | Naylor |
| 2011/0320706 A1 | 12/2011 | Nakajima |
| 2012/0079155 A1 | 3/2012 | Damodaran et al. |
| 2012/0163797 A1 | 6/2012 | Wang |
| 2013/0073878 A1* | 3/2013 | Jayasimha ............ G06F 1/3287 713/300 |
| 2013/0083794 A1 | 4/2013 | Lakshmanamurthy et al. |
| 2013/0117511 A1* | 5/2013 | Brown ................ G06F 12/0831 711/141 |
| 2013/0138858 A1 | 5/2013 | Adler et al. |
| 2013/0185370 A1 | 7/2013 | Li et al. |
| 2013/0262918 A1 | 10/2013 | Nation et al. |
| 2013/0268710 A1 | 10/2013 | Lowe et al. |
| 2014/0082237 A1* | 3/2014 | Wertheimer ............ G06F 13/14 710/104 |
| 2014/0095911 A1 | 4/2014 | Rosenzweig et al. |
| 2014/0115207 A1 | 4/2014 | Iyer et al. |
| 2014/0258578 A1 | 9/2014 | Lakshmanamurthy et al. |
| 2014/0281724 A1 | 9/2014 | Ki et al. |
| 2014/0344485 A1 | 11/2014 | Dondini et al. |
| 2015/0026494 A1 | 1/2015 | Bainbridge et al. |
| 2015/0043575 A1 | 2/2015 | Kumar et al. |
| 2016/0103480 A1 | 4/2016 | Sanghi et al. |
| 2016/0132455 A1* | 5/2016 | Ho ..................... G06F 13/4208 710/105 |
| 2016/0283428 A1 | 9/2016 | Guddeti |
| 2016/0357696 A1* | 12/2016 | Klinglesmith ...... G06F 13/4022 |
| 2017/0017412 A1 | 1/2017 | Luan et al. |
| 2017/0063625 A1 | 3/2017 | Philip et al. |
| 2017/0212550 A1 | 7/2017 | Lee et al. |
| 2017/0289064 A1 | 10/2017 | Bae |
| 2017/0351319 A1* | 12/2017 | Brown ................. G06F 1/3203 |
| 2018/0088961 A1 | 3/2018 | Doshi |
| 2018/0129269 A1* | 5/2018 | Garg .................... G06F 9/4418 |
| 2019/0227979 A1 | 7/2019 | Ganesh et al. |
| 2019/0302861 A1 | 10/2019 | Desai et al. |
| 2019/0303217 A1 | 10/2019 | Desai et al. |
| 2019/0303326 A1 | 10/2019 | Desai et al. |
| 2019/0303777 A1 | 10/2019 | Desai et al. |
| 2019/0303778 A1 | 10/2019 | Desai et al. |
| 2021/0294762 A1 | 9/2021 | Desai et al. |
| 2022/0291730 A1 | 9/2022 | Desai et al. |

FOREIGN PATENT DOCUMENTS

| | | |
|---|---|---|
| JP | 2014209764 | 11/2014 |
| JP | 2017502421 | 1/2017 |
| KR | 20140079417 | 6/2014 |
| KR | 20160066188 | 6/2016 |
| WO | 2010022767 | 3/2010 |
| WO | 2010137572 | 12/2010 |

OTHER PUBLICATIONS

"Non-Final Office Action", U.S. Appl. No. 17/228,529, dated Jun. 24, 2022, 19 pages.

"Extended European Search Report", EP Application No. 19775100.1, dated Dec. 7, 2021, 10 pages.

"Extended European Search Report", EP Application No. 19775361.9, dated Dec. 23, 2021, 8 pages.

"Final Office Action", U.S. Appl. No. 16/368,443, dated Apr. 5, 2021, 18 pages.

"Final Office Action", U.S. Appl. No. 16/368,392, dated Apr. 5, 2021, 30 pages.

"Final Office Action", U.S. Appl. No. 16/368,418, dated Apr. 23, 2021, 11 pages.

"Final Office Action", U.S. Appl. No. 16/368,358, dated May 26, 2020, 25 pages.

"Final Office Action", U.S. Appl. No. 16/368,287, dated May 26, 2020, 29 pages.

"International Preliminary Report on Patentability", Application No. PCT/US2019/023001, dated Oct. 6, 2020, 9 pages.

"International Preliminary Report on Patentability", Application No. PCT/US2019/024586, dated Oct. 6, 2020, 9 pages.

"International Search Report and Written Opinion", Application No. PCT/US2019/024586, dated Jul. 22, 2019, 13 pages.

"International Search Report and Written Opinion", Application No. PCT/US2019/023001, dated Aug. 7, 2019, 11 pages.

"Non-Final Office Action", U.S. Appl. No. 16/368,358, dated Mar. 31, 2020, 23 pages.

"Non-Final Office Action", U.S. Appl. No. 16/368,287, dated Apr. 16, 2020, 27 pages.

"Non-Final Office Action", U.S. Appl. No. 16/369,599, dated Jun. 12, 2020, 22 pages.

"Non-Final Office Action", U.S. Appl. No. 16/368,392, dated Sep. 14, 2021, 7 pages.

"Non-Final Office Action", U.S. Appl. No. 16/369,612, dated Sep. 19, 2019, 9 pages.

"Non-Final Office Action", U.S. Appl. No. 16/368,418, dated Sep. 29, 2021, 25 pages.

"Non-Final Office Action", U.S. Appl. No. 16/368,443, dated Oct. 1, 2021, 16 pages.

"Non-Final Office Action", U.S. Appl. No. 16/368,443, dated Oct. 5, 2020, 18 pages.

(56) References Cited

OTHER PUBLICATIONS

"Non-Final Office Action", U.S. Appl. No. 16/368,392, dated Oct. 7, 2020, 28 pages.
"Non-Final Office Action", U.S. Appl. No. 16/368,418, dated Oct. 7, 2020, 30 pages.
"Notice of Allowance", U.S. Appl. No. 16/369,612, dated Jan. 15, 2020, 5 pages.
"Notice of Allowance", U.S. Appl. No. 16/369,599, dated Jan. 19, 2021, 8 pages.
"Notice of Allowance", U.S. Appl. No. 16/368,443, dated Jan. 25, 2022, 9 pages.
"Notice of Allowance", U.S. Appl. No. 16/368,287, dated Sep. 18, 2020, 10 pages.
"Notice of Allowance", U.S. Appl. No. 16/368,358, dated Sep. 18, 2020, 9 pages.
"Notice of Allowance", U.S. Appl. No. 16/368,358, dated Oct. 23, 2020, 6 pages.
Desai, et al., "Arbitrating Portions of Transactions Over Virtual Channels Associated with an Interconnect", U.S. Appl. No. 16/368,358, filed Mar. 28, 2019, 58 pages.
Desai, et al., "Arbitrating Portions of Transactions over Virtual Channels with an Interconnect", U.S. Appl. No. 16/368,287, filed Mar. 28, 2019, 58 pages.
Desai, et al., "Procedures for Implementing Source Based Routing Within an Interconnect Fabric on a System on Chip", U.S. Appl. No. 16/369,612, filed Mar. 29, 2019, 58 pages.
Desai, et al., "Procedures for Improving Efficiency of an Interconnect Fabric on a System on Chip", U.S. Appl. No. 16/369,599, filed Mar. 29, 2019, 58 pages.
Desai, "Protocol Level Control for System on a Chip (soc) Agent Reset and Power Management", U.S. Appl. No. 16/368,392, filed Mar. 28, 2019, 61 pages.
Desai, et al., "Protocol Level Control for System on a Chip (soc) Agent Reset and Power Management", U.S. Appl. No. 16/368,418, filed Mar. 28, 2019, 61 pages.
Desai, et al., "Protocol Level Control for System on a Chip (soc) Agent Reset and Power Management", U.S. Appl. No. 16/368,443, filed Mar. 28, 2019, 61 pages.
"Foreign Office Action", JP Application No. 2020-552300, dated Jan. 31, 2023, 9 pages.
"Non-Final Office Action", U.S. Appl. No. 17/804,367, dated Nov. 28, 2022, 18 pages.
"Notice of Allowance", U.S. Appl. No. 17/228,529, dated Dec. 21, 2022, 8 pages.
"Extended European Search Report", EP Application No. 23160394.5, dated May 26, 2023, 8 pages.
"Final Office Action", U.S. Appl. No. 17/804,367, dated Jun. 5, 2023, 9 pages.
"Foreign Office Action", IL Application No. 20200277567, dated Mar. 19, 2023, 4 pages.
"Foreign Office Action", IL Application No. 277566, dated Mar. 19, 2023, 4 pages.
"Foreign Office Action", JP Application No. 2020-552287, dated Apr. 14, 2023, 15 pages.
"Foreign Office Action", JP Application No. 2020552300, dated Aug. 8, 2023, 5 pages.
"Non-Final Office Action", U.S. Appl. No. 17/804,367, dated Sep. 11, 2023, 21 pages.
"Foreign Office Action", KR Application No. 10-2020-7026420, dated Nov. 8, 2023, 38 pages.

\* cited by examiner

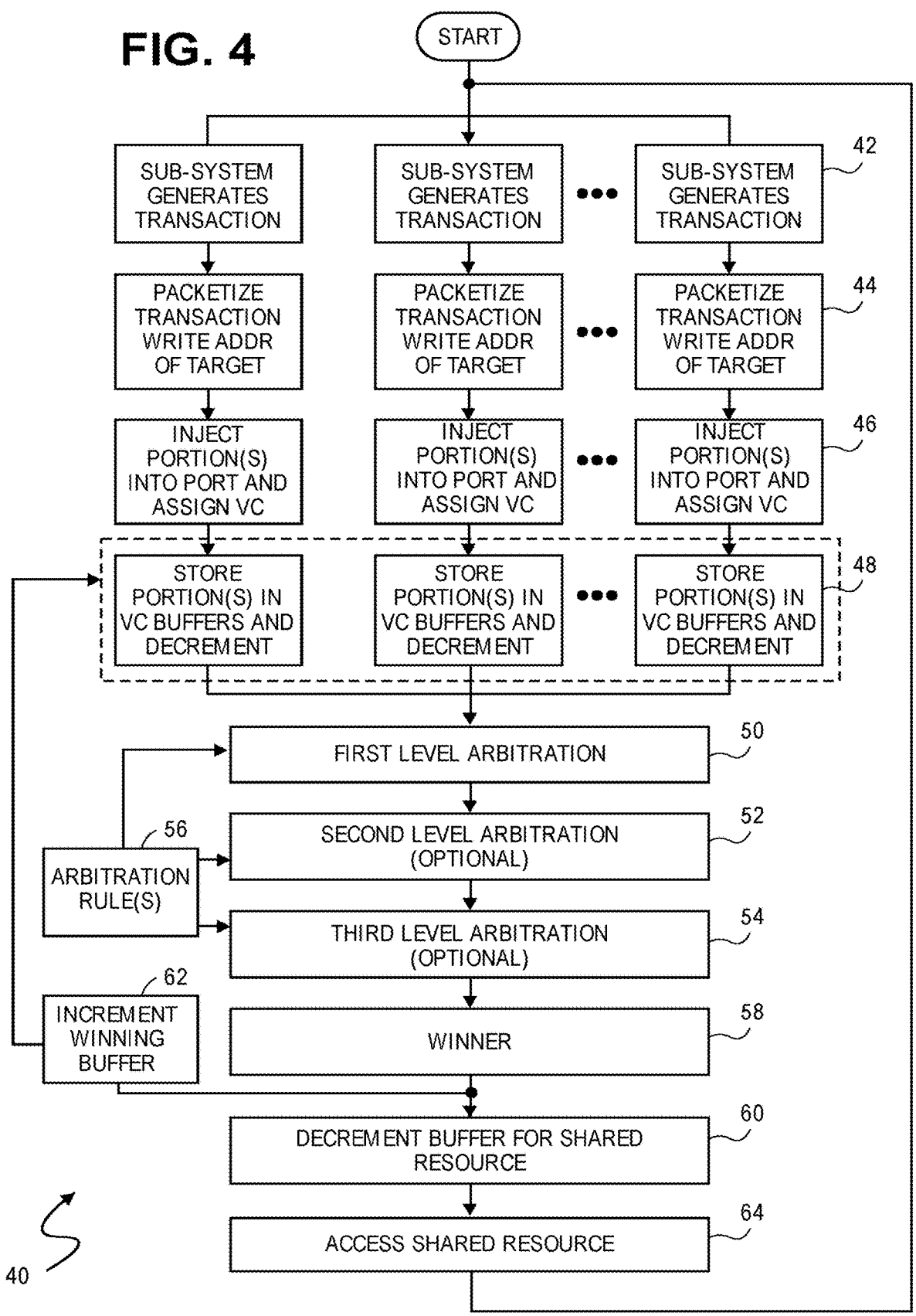

PROTOCOL LEVEL CONTROL FOR SYSTEM ON A CHIP (SOC) AGENT RESET AND POWER MANAGEMENT

RELATED APPLICATION(S)

This application is a continuation of and claims priority to U.S. Non-Provisional patent application Ser. No. 16/368,443, filed on Mar. 28, 2019, which in turn claims priority to U.S. Provisional Patent Application Ser. No. 62/691,117, filed on Jun. 28, 2018, and to U.S. Provisional Patent Application Ser. No. 62/650,589, filed on Mar. 30, 2018, the disclosures of which are incorporated by reference herein in their entireties.

BACKGROUND

The present application is directed to a System on a Chip (SoC), and more particularly, to a system and method for consistently implementing reset and/or power management functionality on SoC, which in turn, provides a more uniform system software view of SoCs, particularly across families of SoCs.

A System on a Chip ("SoC") is an integrated circuit that includes multiple sub-systems, often referred to as Intellectual Property ("IP") agents. IP agents are typically "reusable" blocks of circuitry designed to implement or perform a specific function. By using IP agents, the time and cost of developing complex SoCs can be significantly reduced.

SoCs typically include a system controller and an interconnect, such as a bus or Network on a Chip (NoC). The system controller runs system software and is provided to manage the overall operation of the SoC. The various IP agents are connected to the interconnect via one or more links and communicate with one another via the interconnect.

SoC developers commonly use disparate IP agents, often from multiple vendors. Each IP agent will ordinarily implement its own unique procedures for reset. From the perspective of the system controller and the interconnect on the SoC, this is problematic for several reasons.

A typical SoC will normally have multiple IP agents connected to the interconnect. Upon reset, each of the IP agents will likely emerge from the reset state at different times due to the unique reset procedures each uses. The different times each IP agent emerges from reset can cause significant problems. If a source IP agent generates a transaction for a destination IP agent that is still in reset, then the (1) destination IP agent is unable to process the request and (2) source IP agent never receives a reply. As a result, the entire system may get hung up, possibly requiring a system-wide reset.

One known approach to prevent hang-ups is to design and place circuitry intermediate each link, between the interconnect and each IP agent. The purpose of this circuitry is to make sure that all the IP agents connected to the interconnect emerge from reset during the same clock cycle. This approach, however, has drawbacks for several reasons:

1. The design of the intermediate circuitry requires time and effort that will often delay the development of the SoC.
2. The intermediate circuitry, from one SoC to another, is typically developed by different design teams. As a result, the intermediate circuitry is usually different from one SoC to the next, or even between different sub-systems on the same SoC.
3. The complexity of the circuitry normally means the number of IP agents that can be connected to a given interconnect is limited. The practical effect of this restriction is that more interconnect levels are needed to accommodate a given number of IP agents. The overall complexity of the SoC is therefore increased.

On occasion, IP agents malfunction. For example, IP agents may inject spurious transactions onto the interconnect, may fail to respond to a received transaction, generate an exception message, etc. In certain situations, the malfunctioning IP agent may need to be reset. With current SoC interconnect standards, there is no standardized IP agent reset mechanism. Either the entire SoC has to be reset, or intermediary circuitry needs to be designed to perform the necessary isolation, reset, and re-introduction of the IP to the system, etc.

Power management is also not addressed with certain current SoC interconnect standards. The Advanced Microcontroller Bus Architecture (AMBA) protocol, for instance, does not address power management, and provides no method for intentionally powering down or turning off IP agents. To provide this capability, power management functionality typically needs to be custom designed into the SoC on a chip-by-chip basis, by developing for instance, additional intermediate circuitry on the links for handing power management.

Many companies offering multiple SoCs will share certain amounts of the system software among similar devices to reduce the time to market. However, even with SoCs that are similar, the software typically cannot simply be ported from one device to another, even in situations where the IP agents may be the same. If there are minor differences in any intermediate circuitry used for reset and/or power management, the system software may need to be modified and debugged for each device.

Companies that develop a large number of SoCs are thus challenged with (1) developing customized circuitry for implementing reset and possibly power management for each device and (2) modifying and debugging the system software for each device. This effort, across multiple devices is expensive, complex and time consuming, reducing the ability to quickly bring products to market.

A system for consistently implementing reset and power management of IP agents on SoCs, removing the need for customization, and which leads to a consistent system software view among multiple SoCs, is therefore needed.

SUMMARY

A system for consistently implementing reset and power management of IP agents on SoCs, removing the need for customization, and which leads to a consistent system software view among multiple SoCs, is disclosed.

In one embodiment, the system includes one or more IP agents, an interconnect and one or more links between the IP agents and the interconnect respectively. When the IP agents undergo a reset, an individual negotiation takes place between the interconnect and each IP agent over the link. With the individual negotiations, each IP agent can emerge from reset at its own time schedule, independently of the timing of the other IP agents. Upon emerging from reset, each IP agent becomes "transaction ready" and is introduced to the interconnect, becoming visible to other elements connected to the interconnect, such as the system controller.

In another embodiment, the interconnect may be configured as a proxy for any IP agent that is inoperable. This feature is beneficial because it prevents system wide hang ups that may otherwise occur when an IP agent is targeted with a transaction (1) prior to being transaction ready, (2) malfunctioning and/or (3) inoperable when in a powered down state. With the interconnect acting as a proxy, an exception message can be sent to the source sending the transaction, preventing a hang up caused by the source waiting indefinitely for a response from the target IP agent.

In yet other embodiments, the ability to arrange for the interconnect to act as a proxy for an IP agent enables (1) IP agents to be individually reset and (2) IP agents to be placed in a power saving state. In various embodiments, the power saving state can include one of several modes, including a low power, operational mode, a low power inoperable mode with state information either maintained or not retained, or a power off mode.

The present invention thus solves a number of issues. It eliminates the need to create custom circuitry for (1) managing each IP agent to emerge from reset during the same time/clock cycle and (2) power management of IP agents. Instead, the present invention advantageously provides a uniform implementation for both these functions, which leads to a consistent system software view among multiple SoCs. With this consistent software view, much of the custom design and software modifications across families of SoCs is eliminated, saving development costs, reducing complexity, and providing a quicker time to market.

BRIEF DESCRIPTION OF THE DRAWINGS

The present application and the advantages thereof, may best be understood by reference to the following description taken in conjunction with the accompanying drawings in which:

FIG. 4 is a flow diagram illustrating operational steps for arbitrating and sending portion(s) of transactions over virtual channels of the shared interconnect in accordance with a non-exclusive embodiment.

In the drawings, like reference numerals are sometimes used to designate like structural elements.

DETAILED DESCRIPTION

Figure 1:
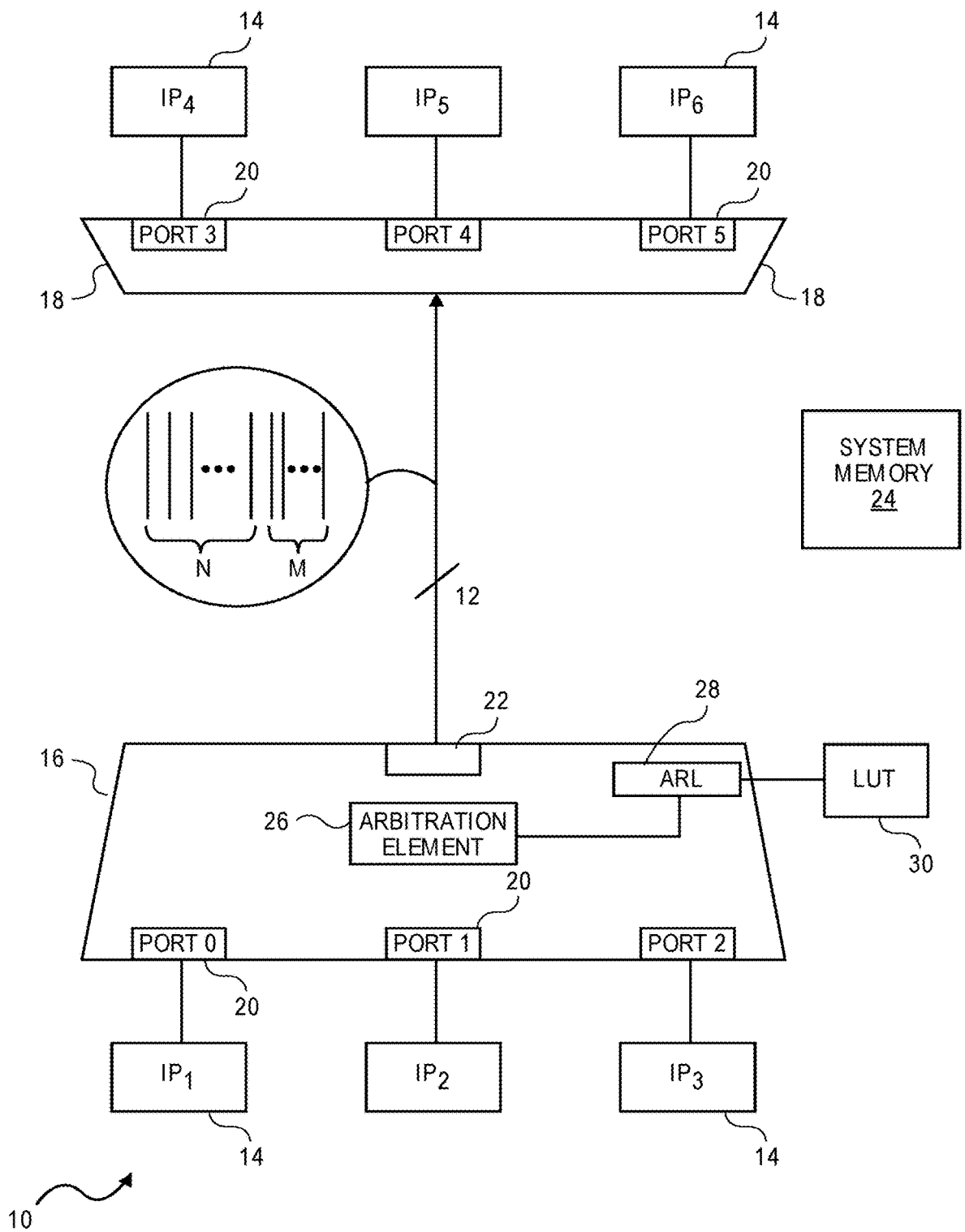
FIG. 1 is a block diagram of a shared interconnect for a System on a Chip (SoC) in accordance with a non-exclusive embodiment.

The present application will now be described in detail with reference to a few non-exclusive embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

Many of the integrated circuits under development today are extremely complex. As a result, many chip designers have resorted to the System on a Chip or "SoC" approach, interconnecting a multiple sub-systems or IP agents on a single piece of silicon. SoCs are now available or are being developed for wide variety of applications, such as consumer devices (e.g., handheld, mobile phones, tablet computers, laptop and desktop computers, media processing etc.), virtual or augmented reality (e.g., robotics, autonomous vehicles, aviation, etc.), medical instrumentation (e.g., imaging, etc.), industrial, home automation, industrial (e.g., smart appliances, home surveillance, etc.) and data center applications (e.g., network switches, attached storage devices, etc.).

The present application is broadly directed to an arbitration system and method for arbitrating access to a shared resource. Such a shared resource can be, for example, a bus interconnect, a memory resource, a processing resource, or just about any other resource that is shared among multiple vying parties. For the sake of illustration, the shared resources as described in detail below is an interconnect that is shared by a plurality of sub-systems on a System on a Chip or "SoC".

With an SoC, as described in detail below, there are a plurality of sub-systems that exchange traffic with one another in the form of transactions, the shared resource is a physical interconnect, various transactions, or portions thereof, are transmitted over a multiplicity of virtual channels associated with the shared interconnect and one of a number of different arbitration schemes and/or priorities may be used to arbitrate access to the shared interconnect for the transmission of transactions between the sub-functions.

Transaction Classes

Within the above-mentioned shared interconnect used for SoCs, there are at least three types or classes of transactions, including Posted (P), Non-posted (NP) and Completion (C). A brief definition of each is provided in Table I below.

TABLE 1

| Transaction Class | Description |
| --- | --- |
| Posted (P) | A transaction that requires no response (e.g., a write operation) |
| Non-posted (NP) | A transaction that requires a response transaction from the destination agent (e.g., a read or a write operation) |
| Completion (C) | A response transaction for a non-posted transaction. |

A Posted transaction, such as a write, requires no response transaction. Once a source writes data to a designated destination, the transaction is finished. With a Non-posted transaction, such as either a read or a write, a response is required. However, the response is bifurcated as a separate Completion transaction. In other words with a read, a first transaction is used for the read operation, while a separate, but related, Completion transaction is used for returning the read contents. With a Non-posted write, a first transaction is used for the write, while a second related Completion transaction is required for the confirmation once the write is complete.

Transactions, regardless of the type, can be represented by one or more packets. In some circumstances, a transaction may be represented by a single packet. In other circumstances, multiple packets may be needed to represent the entire transaction.

A beat is the amount of data that can be transmitted over the shared interconnect per clock cycle. For example if the shared interconnect is physically 128 bits wide, then 128 bits can be transmitted each beat or clock cycle.

In some circumstances, a transaction may need to be divided into multiple portions for transmission. Consider a transaction having a single packet that has a payload that is 512 bits (64 bytes). If the shared interconnect is only 128 bits wide (16 bytes), then the transaction needs to be segmented into four portions (e.g. 4.times.128=512) and transmitted over four clock cycles or beats. On the other hand if a transaction is only a single packet that is 128 bits wide or less, then the entire transaction can be sent in one clock cycle or beat. If the same transaction happens to include additional packets, then additional clock cycles or beats may be needed.

The term "portion" of a transaction is therefore the amount of data that can be transferred over the shared interconnect during a given clock cycle or beat. The size of a portion may vary depending on the physical width of the shared interconnect. For instance, if the shared interconnect is physically 64 data bits wide, then the maximum number of bits that can be transferred during any one cycle or beat is 64 bits. If a given transaction has a payload of 64 bits or less, then the entire transaction can be sent over the shared interconnect in a single portion. On the other hand if the payload is larger, then the packet has to be sent over the shared interconnect in multiple portions. A transaction with a payload of 128, 256 or 512 bits requires two (2), four (4) and eight (8) portions respectively. As such, the term "portion" or "portions" should therefore be broadly construed to mean either part of or an entire transaction that may be sent over the share interconnect during any given clock cycle or beat.

Streams

A stream is defined as the pairing of a virtual channel and a transaction class. For instance, if there are four (4) virtual channels (e.g., VC0, VC1, VC2 and VC3) and three (3) transaction classes (P, NP, C), then there are a maximum of twelve (12) different possible streams. The various combinations of virtual channels and transaction classes are detailed below in Table II.

TABLE II

| Stream Number | VC/TC Combination |
| --- | --- |
| 1 | VC0/NP |
| 2 | VC0/P |
| 3 | VC0/C |
| 4 | VC1/NP |
| 5 | VC1/P |
| 6 | VC1/C |
| 7 | VC2/NP |
| 8 | VC2/P |
| 9 | VC2/C |
| 10 | VC3/NP |
| 11 | VC3/P |
| 12 | VC3/C |

It should be noted that the number of transaction classes discussed above is merely exemplary and should not be construed as limiting. On the contrary, any number of virtual channels and/or transaction classes may be used.

Arbitration Over Virtual Channels of a Shared Interconnect

Referring to FIG. 1, a block diagram of an arbitration system 10 is shown. In a non-exclusive embodiment, the arbitration system is used for arbitrating access by a number of sub-functions 14 (i.e., $IP_1$, $IP_2$ and $IP_3$) to a shared interconnect 12 attempting to send transactions to upstream sub-functions 14 (i.e., $IP_4$, $IP_5$ and $IP_6$).

The shared interconnect 12 is a physical interconnect that is N data bits wide and includes M control bits. The shared interconnect 12 is also one-directional, meaning it handles traffic only from a source (i.e., $IP_1$, $IP_2$ and $IP_3$) to a destination (i.e., $IP_4$, $IP_5$ and $IP_6$).

In various alternatives, the number of N data bits can be any integer, but typically is some power of the number 2 (e.g., $2^1$, $2^2$, $2^3$, $2^4$, $2^5$, $2^6$, $2^7$, $2^8$, $2^9$ etc.) or (2, 4, 6, 8, 16, 32, 64, 128, 256 etc.) bits wide respectively. With most real-world applications, the number of N bits is either 32, 64, 128, 256 or even 512. However, it should be understood that these widths are merely illustrative and should not be construed as limiting in any manner.

The number of control bits M may also vary and be any number.

One or more logical channels (not illustrated), hereafter referred to as "virtual channels" or "VCs" are associated with the shared interconnect 12. Each virtual channel is independent. Each virtual channel may be associated with multiple independent streams. The number of virtual channels may widely vary. For example, up to thirty-two (32) or more virtual channels may be defined or associated with the shared interconnect 12.

In various alternative embodiments, each virtual channel may be assigned a different priority. One or more virtual channel(s) may be assigned a higher priority, while one or more other virtual channel(s) may be assigned a lower priority. The higher priority channels are awarded or arbitrated access to the shared interconnect 12 over the lower priority virtual channels. With other embodiments, each of the virtual channels may be given the same priority, in which case, no preference is given to one virtual channel versus another when awarding or arbitrating access to shared interconnect 12. In yet other embodiments, the priority assigned to one or more of the virtual channels may also dynamically change. For instance, in a first set of circumstances, all the virtual channels may be assigned the same priority, but in a second set of circumstances, certain virtual channel(s) can be assigned a higher priority than other virtual channel(s). Thus as circumstances change, the priority scheme used among the virtual channels can be varied to best meet current operating conditions.

Each of the sub-systems 14 is typically a block of "reusable" circuitry or logic, commonly referred to as an IP core or agent. Most IP agents are designed to perform a specific function, for example, controllers for peripheral devices such as an Ethernet port, a display driver, an SDRAM interface, a USB port, etc. Such IP agents are generally used as "building blocks" that provide needed sub-system functionality within the overall design of a complex system provided on an integrated circuit (IC), such as either an Application Specific Integrated Circuit (ASIC) or a Field Programmable Gate Array (FPGA). By using a library of available IP agents, a chip designer can readily "bolt" together various logic functions in the design of a more complex integrated circuit, reducing design time and saving development costs. Although sub-system agents 14 are described above in terms of a dedicated IP core, it should be understood that this is not a necessary requirement. On the contrary, a sub-system 14 can also be a collection of IP functions connected to or sharing a single port 20. Accordingly, the term "agent" should be broadly construed as any type of sub-system connected to a port 20, regardless if the sub-system performs a single function or multiple functions.

A pair of switches 16 and 18 provides access between each of the sub-system agents 14 and the shared interconnect 12 via dedicated access ports 20 respectively. With the exemplary embodiment shown:

(1) The sub-system agents $IP_1$, $IP_2$, and $IP_3$ connect with switch 16 via access Port 0, Port 1 and Port 2 respectively.

(2) The sub-system agents $IP_4$, $IP_5$, and $IP_6$ connect with switch 18 via Port 3, Port 4 and Port 5 respectively.

(3) In addition, an access port 22, via the interconnect 12, provides sub-system agents $IP_4$, $IP_5$, and $IP_6$ access to switch 16 in the aggregate.

The switches 16 and 18 perform multiplexing and de-multiplexing functions. Switch 16 selects up-stream traffic generated by the sub-system agents $IP_1$, $IP_2$, and/or $IP_3$ and sends the traffic downstream over the shared interconnect 12. At the switch 18, a de-multiplexing operation is performed and the traffic is provided to a target sub-system agent (i.e., either $IP_4$, $IP_5$, or $IP_6$).

Each access port 20 has a unique port identifier (ID) and provides each sub-system agent 14 dedicated access to either switch 16 or 18. For instance, sub-system agents $IP_1$, $IP_2$ and $IP_3$ are assigned to access ports Port 0, Port 1 and Port 2 respectively. Similarly, the sub-system agents $IP_4$, $IP_5$ and $IP_6$ are assigned access ports Port 3, Port 4 and Port 5 respectively.

Besides providing ingress and egress points to/from the switches 16, 18, the unique port IDs 20 are used for addressing traffic between the sub-system agents 14. Each Port 20 has a certain amount of allocated addressable space in system memory 24.

In certain non-exclusive embodiments, all or some of the access ports 20 can also be assigned a "global" port identifier as well their unique port ID. Transactions and other traffic can be sent to all or some of the access ports assigned to the global port identifier. Accordingly, with the global identifier, transactions and other traffic can be widely disseminated or broadcast to all or some of the access ports 20, obviating the need to individually address each access port 20 using its unique identifier.

The switch 16 also includes an arbitration element 26, Address Resolution Logic (ARL) 28 and an address resolution Look Up Table (LUT) 30.

During operation, the sub-system agents $IP_1$, $IP_2$ and $IP_3$ generate transactions. As each transaction is generated, it is packetized by the originating sub-system agent 14 and then the packetized transaction is injected via the corresponding port 20 into a local switch 16. For instance, portions of transactions generated by $IP_1$, $IP_2$ and $IP_3$ are provided to switch 16 by via ports Port 0, Port 1 and Port 2 respectively.

The ports 20 each include a number of first-in, first-out buffers (not illustrated) for each of the virtual channels associated with the interconnect channel 12 respectively. In a non-exclusive embodiment, there are four (4) virtual channels. In which case, each port 20 includes four buffers, one for each virtual channel Again, it should be understood that the number of virtual channels and buffers contained in the ports 20 may vary and is not limited to four. On the contrary, the number of virtual channels and buffers may be more or less than four.

If a given transaction is represented by two (or more) portions, those portions are maintained in the same buffer. For instance, if interconnect 12 is 128 data bits wide and a transaction is represented by a packet containing a payload of 512 bits, then the transaction needs to be segmented into four (4) portions that are transmitted over four clock cycles or beats. On the other hand if the transaction can be represented by a single packet having a payload of 64 bits, then the single portion can be transmitted in one clock cycle or beat. By maintaining all the portion(s) of given transaction in the same buffer, the virtual channels remain logically independent. In other words, all the traffic associated with a given transaction is always sent over the same virtual channel as a stream and is not bifurcated over multiple virtual channels.

The arbitration element 26 is responsible for arbitrating among the competing buffered portions of transactions maintained by the various access ports 20. In a non-exclusive embodiment, the arbitration element 26 performs an arbitration every clock cycle, provided multiple competing transactions are available. The arbitration winner per cycle yields a portion of a transaction, from one of the sub-systems $IP_1$, $IP_2$ and $IP_3$, that is granted access to and is transmitted over the interconnect 12.

When generating transactions, the source sub-system $IP_1$, $IP_2$ and $IP_3$ ordinarily knows the address in the address space for the possible destination sub-system agents $IP_4$, $IP_5$ and $IP_6$, but does not know the information (e.g., the Port IDs 20 and/or 22) needed to route the transactions to their destinations. In one embodiment, the local Address Resolution Logic (ARL) 28 is used for resolving the known destination address into the needed routing information. In other words, a source sub-agent 14 may simply know that it wishes to access a given address in system memory 24. The ARL 28 is therefore tasked to access the LUT 30 and performs an address look up of the port(s) 20/22 along the delivery path to the final destination corresponding to the specified address. Once the ports 20/22 is/are known, this information is inserted in a destination field in the packet(s) of the transaction. As a result, the packet(s) is/are delivered to the ports 20/22 along the delivery path. As a general rule, downstream nodes along the delivery path do not have to perform additional look up(s) since the required delivery information is already known and included in the destination field of the packet(s). With other types of transactions, referred to as Source Based Routing (SBR) as described in more detail below, the source IP agent knows the destination port address. As a result, the lookup performed by the ARL 28 typically does not need to be performed.

In an alternative embodiment, not all the nodes within the interconnect require an ARL 28 and LUT 30. For nodes that do not have these elements, transactions without needed routing information can be forwarded to a default node. At the default node, an ARL 28 and LUT 30 are accessed and the needed routing information can then be inserted into the headers of the packet(s) of transactions. The default node is typically upstream from the node without the ARL 28 and LUT 30. However, this is by no means a requirement. The default node, or nodes, can be located anywhere on the SoC. By eliminating ARLs 28 and LUTs 30 from certain nodes, their complexity can be reduced.

The ARL 28 may also be referred to as an "ordering point" because, besides decoding the forwarding destination for winning portion(s) of transactions, it defines a sequence order for the winning portion(s) of transactions within each virtual channel. As each arbitration is resolved, regardless of whether or not the ARL 28 is used to perform an address port lookup, the winning portions of transactions are inserted into a first-in, first out queue provided for each virtual channel. The winning portions of transactions then await their turn for transmission over the interconnect 12 in the buffer.

ARL 28 is also used for defining "upstream" and downstream" traffic. In other words any transactions generated by the IP agents 14 associated with switch 16 (i.e., $IP_1$, $IP_2$ and $IP_3$) is considered upstream with respect to the ARL 28. All transaction post the ARL 28 (i.e., transmitted to $IP_4$, $IP_5$ and $IP_6$) is considered down-stream traffic.

The IP agents 14 associated with switch 16 (i.e., $IP_1$, $IP_2$ and $IP_3$) may communicate and send transactions to one another, either directly or indirectly. With direct communication, often referred to as Source Based Routing (SBR), the IP agents 14 can send transactions to one another in a peer-to-peer model. With this model, the source IP agent knows the unique Port ID of its peer IP agents 14, bypassing the need to use the ARL 28 to access the LUT 30. Alternatively, the transactions between the IP agents associated with the switch 16 can be routed using the ARL 28. With this model, similar to that described above, the source IP agent only knows the address of the destination IP agent 14, but not the information needed for routing. The ARL 28 is then used to access the LUT 30, find the corresponding Port ID, which is then inserted into the destination field of the packet(s) of the transaction.

Packet Format

The IP agents 14 create and process transactions over virtual channels associated with the interconnect 12. Each transaction typically is made up of one or more packets. Each Packet typically has a fixed header size and format. In some instances, each packet may have a fixed sized payload. In other instances, packet payloads may vary in size, from large too small, or even with no payload at all.

Figure 2:
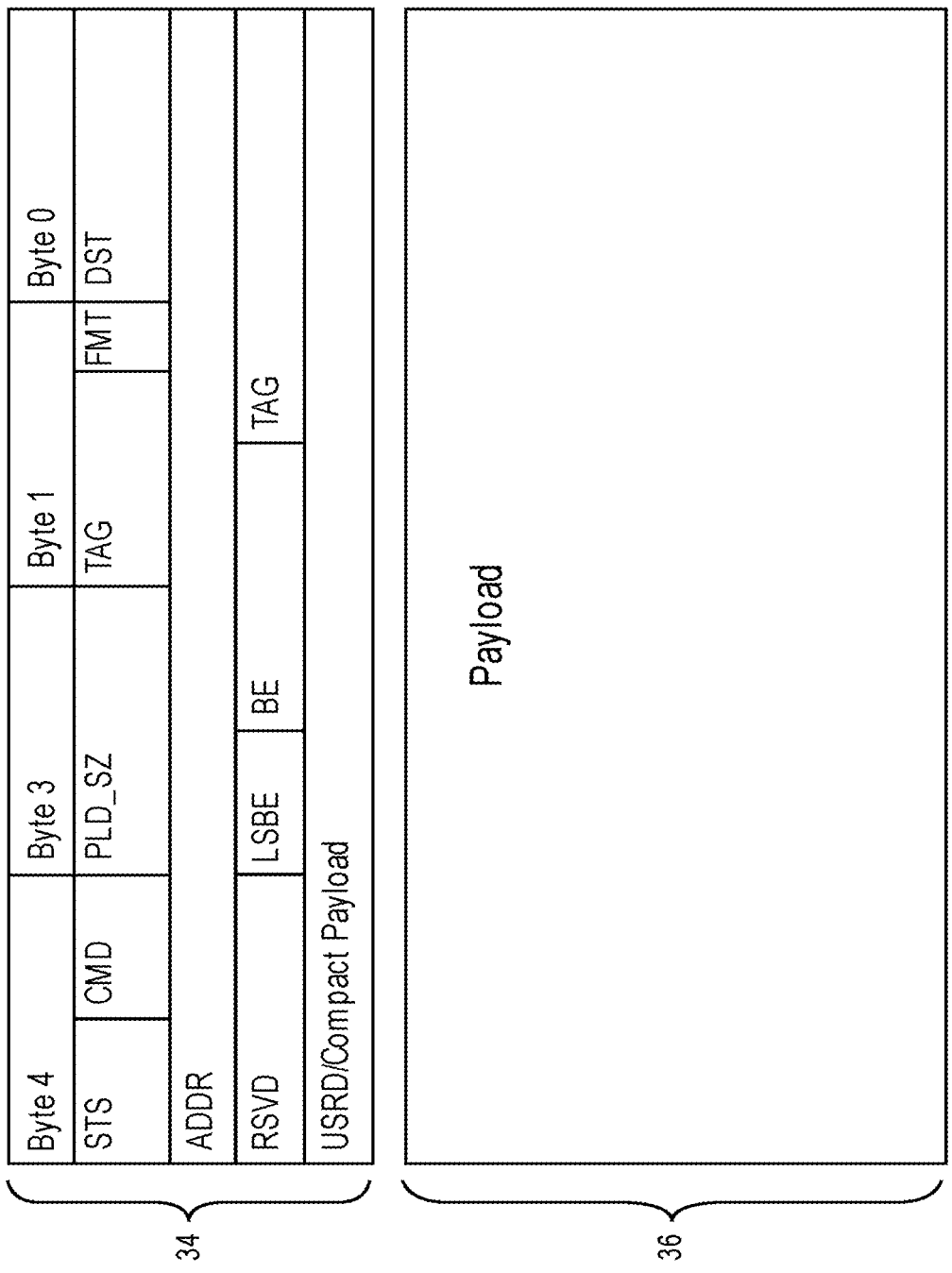
FIG. 2 is an exemplary packet of a transaction in accordance with a non-exclusive embodiment.

Referring to FIG. 2, an exemplary packet 32 is shown. The packet 32 includes a header 34 and a payload 36. In this particular embodiment, the header 34 is sixteen (16) Bytes in size. It should be understood that this size is exemplary and either a larger size (e.g., more Bytes) or smaller size (e.g., fewer Bytes) packets may be used. It should also be understood that headers 34 of packets 32 do not necessarily have to all be the same size. In alternative embodiments, the size of packet headers in a SoC may be variable.

The header 34 includes a number of fields including a destination identifier (DST_ID), a source identifier (SRC_ID), a payload size indicator (PLD_SZ), a reserved field (RSVD), a command field (CMD), a TAG field, a status (STS), a transaction ID field (TAG), an address or ADDR field, a USDR/Compact payload field, a transaction Class or TC field, a format FMT filed, and a Byte Enable (BE) field. The various fields of the header 34 are briefly described in Table III below.

TABLE IV

| Row Pass Column? | Posted Request (Column 2) | Non-posted Request (Column 3) | Completion (Column 4) |
| --- | --- | --- | --- |
| Posted Request Row A | No | Yes | (a) Yes (b) Y/N |
| Non-posted Request Row B | No | No | (a) No (b) Y/N |
| Completion Row C | (a) No (b) Y/N | (a) Yes (b) Y/N | No |

The payload 36 contains the contents of the packet. The size of the payload may vary. In some instances, the payload may be large. In other instances, it could be small. In yet other instances, if the content is very small or "compact", it can be transported in the USRD field of the header 34.

The type of transaction will often dictate whether or not the packet(s) used to represent the transaction has/have payloads or not. For example with either a Posted or Non-posted read, the packet(s) will designate the location address to be accessed, but will typically have no payload. The packets for the related Completion transaction, however, will include payload(s) containing the read content. With both Posted and Non-posted write transactions, the packet(s) will include a payload containing the data to be written to the destination. With Non-posted versions of a write, the packets for the Completion transaction will ordinarily not defined a payload. However, in some situations, a Completion transaction will define a payload.

The exemplary packet and above description covers many of basic fields that may be included in a packet. It should be understood that additional fields may be deleted or added. For instance, a private signaling field may be used so a source and a destination may share private messages.

Arbitration

Figure 3A:
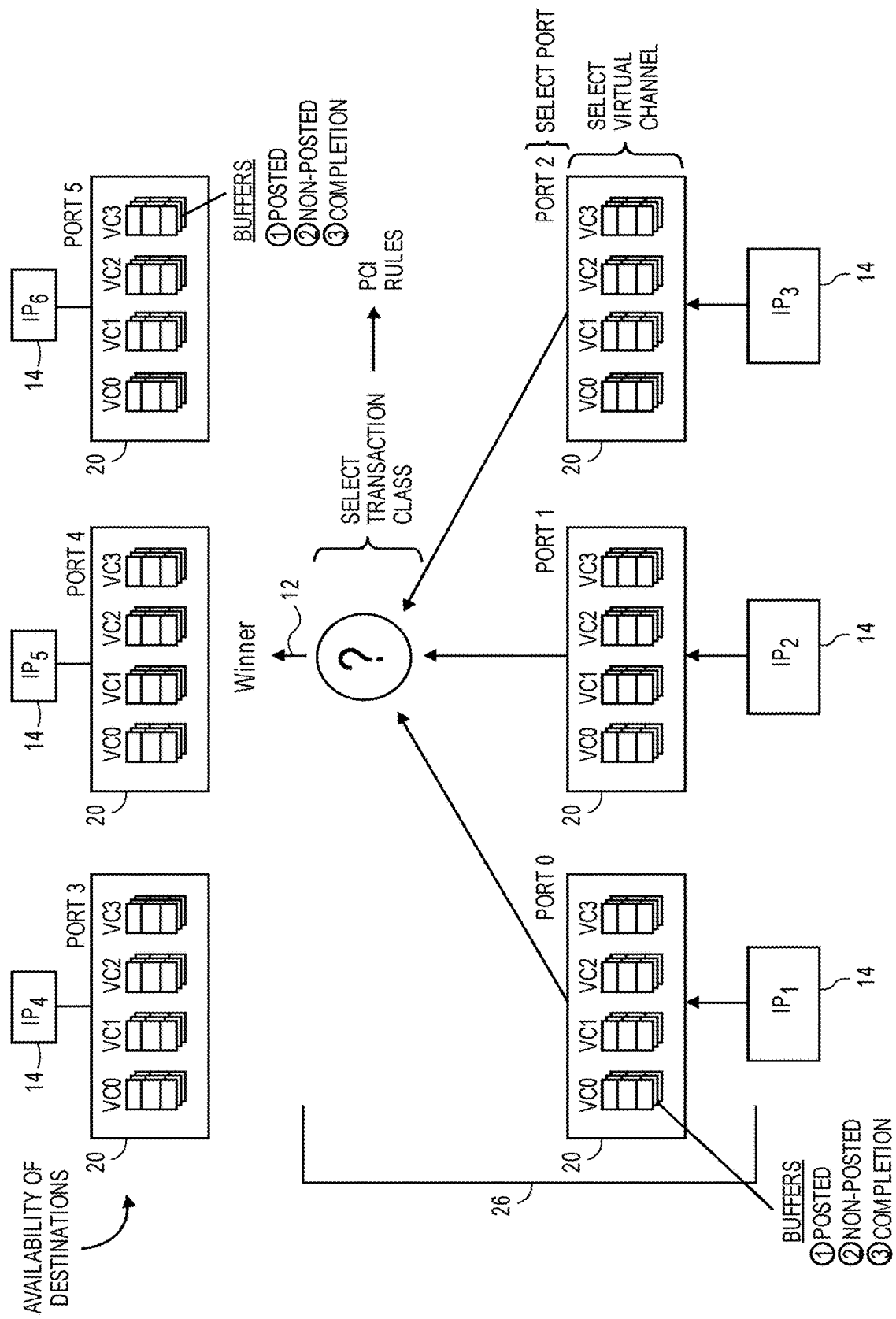
FIG. 3A is a logic diagram illustrating an arbitration element in accordance with a first non-exclusive embodiments.

Referring to FIG. 3A, a logic diagram illustrating the arbitration logic performed by the arbitration element 26 with Peripheral Component Interconnect (PCI) ordering is shown.

With PCI ordering, each Port 20 includes separate buffers for each virtual channel and transaction class (P, NP and C) combination. For instance, with four virtual channels (VC0, VC1, VC2 and VC3), the Ports 0, Port 1 and Port 2 each have twelve first-in, first-out buffers. In other words for each Port 20, a buffer is provided for each transaction class (P, NP, and C) and virtual channel (VC0, VC1, VC2 and VC30 combination.

As each IP agent 14 (e.g., $IP_1$, $IP_2$ and $IP_3$) generates transactions, the resulting packets are placed in the appropriate buffer, based on transaction type, in the corresponding port (e.g., Port 0, Port 1 and Port 2) respectively. For instance, Posted (P), Non-posted (NP) and Completion (C)

transactions generated by $IP_1$ are each placed in the Posted, Non-posted and Completion buffers for the assigned virtual channel in Port 0 respectively. Transactions generated by $IP_2$ and $IP_3$ are similarly placed in the Posted, Non-posted and Completion buffers for the assigned virtual channels in Ports 1 and Port 2 in a similar manner.

If a given transaction is represented by multiple packets, all of the packets of that transaction are inserted into the same buffer. As a result, all of the packets of the transaction are eventually transmitted over the same virtual channel With this policy, the virtual channels remain independent, meaning different virtual channels are not used for transmission of multiple packets associated with the same transaction.

Within each port 20, packets can be assigned to a given virtual channel in a number of different ways. For instance, the assignment can be arbitrary. Alternatively, the assignment can be based on workload and the amount of outstanding traffic for each of the virtual channels. If one channel is very busy and the other not, then the port 20 will often attempt to balance the load and assign newly generated transaction traffic to under-utilized virtual channels. As a result, routing efficiency is improved. In yet other alternatives, transaction traffic can be assigned to a particular virtual channel based on urgency, security, or even a combination of both. If a certain virtual channel is given a higher priority and/or security than others, then high priority and/or secure traffic is assigned to the higher priority virtual channel. In yet other embodiments, a port 20 can be hard-coded, meaning the port 20 has only one virtual channel and all traffic generated by that port 20 is transmitted over the one virtual channel. In yet other embodiments, the assignment can be based on the route chosen to reach the destination port 20.

In yet other embodiments, the assignment of virtual channels can be implemented by the source IP agents 14, either alone or in cooperation with its corresponding port 20. For example, a source IP agent 14 can generate a control signal to the corresponding port 20 requesting that packet(s) of a given transaction be assigned to a particular virtual channel IP agents 14 can also make assignment decisions that are arbitrary, hard coded, based on balanced usage across all the virtual channels, security, urgency, etc., as discussed above.

In selecting an arbitration winner, the arbitration element 26 performs multiple arbitration steps per cycle. These arbitration steps include:

(1) Selecting a port;
(2) Selecting a virtual channel; and
(3) Selecting a transaction class.

The above order (1), (2) and (3) is not fixed. On the contrary, the above three steps may be completed in any order. Regardless of which order is used, a single arbitration winner is selected each cycle. The winning transaction is then transmitted over the corresponding virtual channel associated with the interconnect 12.

For each arbitration (1), (2) and (3) performed by arbitration element 26, a number of arbitration schemes or rule sets may be used. Such arbitration schemes may include strict or absolute priority, a weighed priority where each of the four virtual channels is assigned a certain percentage of transaction traffic or a round-robin scheme where transactions are assigned to virtual channels in a predefined sequence order. In additional embodiments, other priority scheme such may be used. Also, it should be understood that the arbitration element 26 may dynamically switch among the different arbitration schemes from time-to-time and/or use the same or different arbitration schemes for each of the (1), (2) and (3) arbitrations respectively.

In an optional embodiment, availability of the destination ports 20 defined by the outstanding transaction(s) considered during a given arbitration cycle are considered. If a buffer in a destination port 20 does not have the resources available to process a given transaction, then the corresponding virtual channel is not available. As a result, the transaction in question does not compete in the arbitration, but rather, waits until a subsequent arbitration cycle when the target resource becomes available. On the other hand, when target resource(s) is/are available, the corresponding transaction(s) are arbitrated and compete for access to the interconnect 12.

The availability of the destination ports 20 may be checked at different times with respect to the multiple arbitration steps (1), (2) and (3) noted above. For instance, the availability check can be performed prior to the arbitration cycle (i.e., prior to completion of any of steps (1), (2) and (3)). As a result, only transactions that define available destination resources is/are considered during the subsequent arbitration. Alternatively, the availability check can be performed intermediate any of the three arbitration steps (1), (2) and (3), regardless of the order in which they are implemented.

There are advantages and disadvantages in performing the destination resource availability check early or late in the arbitration process. By performing the check early, possible competing portions of transactions can potentially be eliminated from the competition if their destinations are not available. However, early notice of availability may create a significant amount of overhead on system resources. As a result, depending on circumstances, it may be more practical to perform the availability check later in a given arbitration cycle.

For the arbitration step involving the selection of a transaction class, a number of rules are defined to arbitrate among competing portions of N, NP and C transactions. These rules include:

For Posted (P) Transactions

A Posted transaction portion may not pass another Posted transaction portion;
A Posted transaction portion must be able to pass a Non-posted transaction portion to avoid deadlock;
A Posted transaction portion must be able to pass a Completion if both are in a strong order mode. In other words in the strong mode, the transaction need to be performed strictly in accordance with the rules and the rules cannot be relaxed; and
A Posted request is permitted to pass a Completion, but passage is not mandatory, if any transaction portion has its Relaxed Order (RO) bit set. With relaxed order, the rules are generally followed, however exceptions can be made.

For Non-Posted (NP) Transactions

A Non-posted transaction portion must not pass a Posted transaction portion;
A Non-posted transaction portion must not pass another Non-posted transaction portion;
A Non-posted transaction portion must not pass a Completion if both are in the strong order mode; and
A Non-posted transaction portion is permitted to pass a Completion, but is not mandatory, if any transaction portion has its RO bit set.

For Completion (C) Transactions

A Completion must not pass a Posted transaction portion if both are in the strong order mode;

A Completion is permitted to pass a Posted transaction portion, but is not mandatory, if any transaction portion has its RO bit set;

A Completion must not pass a Non-posted transaction portion if both are in the strong order mode;

A Completion is permitted to pass a Non-posted transaction portion, but is not mandatory, if any transaction portion has its RO bit set; and A Completion is not permitted to pass another Completion.

Table IV below provides a summary of the PCI ordering rules. In the boxes with no (a) and (b) options, then the strict ordering rules need to be followed. In the boxes of the Table having (a) and (b) options, either strict order (a) or relaxed order (b) rules may be applied, depending on if the RO bit is reset or set respectively. In various alternative embodiments, the RO bit can be set or reset either globally or on individually on the packet level.

TABLE III

| Name of Field | Description |
| --- | --- |
| DST | Specifies the corresponding Port ID for the targeted IP agent 14. |
| SRC | Specifies the Port ID for the sending IP agent 14. |
| PLD_SZ | Specifies the size of the payload of the packet. |
| CMD | Specifies the type of transaction/command the packet contains. Exemplary commands may include Incremental Read, Incremental Write, Compact Read, Compact Write, Write to FIFO, Destructive Incremental Read, Wrap, etc. |
| TAG | Specifies a transaction ID for the packet. Transactions IDs are used for matching Non-posted transactions and their corresponding Completion transactions. When a Completion transaction including a matching transaction ID in the TAG field is received, the corresponding Non-posted read or write operation is complete. |
| ADDR | Specifies the physical address in the system memory 24 of the request |
| USRD/Compact payload | If the payload of the packet is sufficiently small, it can be transported in this field in the header, not the payload. This field can also be used to transport a private or secure message between the source and the destination IP ports. |
| STS | This field is valid only with Completion packets. Specifies the status of the corresponding Non-posted transaction, (i.e., either a successful completion or a failed transaction). |
| RSVD | This is a reserved field that can also be used to transport a private or secure message between the source and the destination IP ports. |
| FMT | Specifies the format specification if multiple header formats are defined and used. |
| BE | Byte Enable, indicates which bytes in the payload are valid. |

The arbitration element 26 selects an ultimate winning transaction portion by performing, in no particular order, arbitrations among competing Ports 20, virtual channels and transactions classes respectively. The winning portion per cycle gains access to the shared interconnect 12 and is transmitted over the corresponding virtual channel.

Figure 3B:
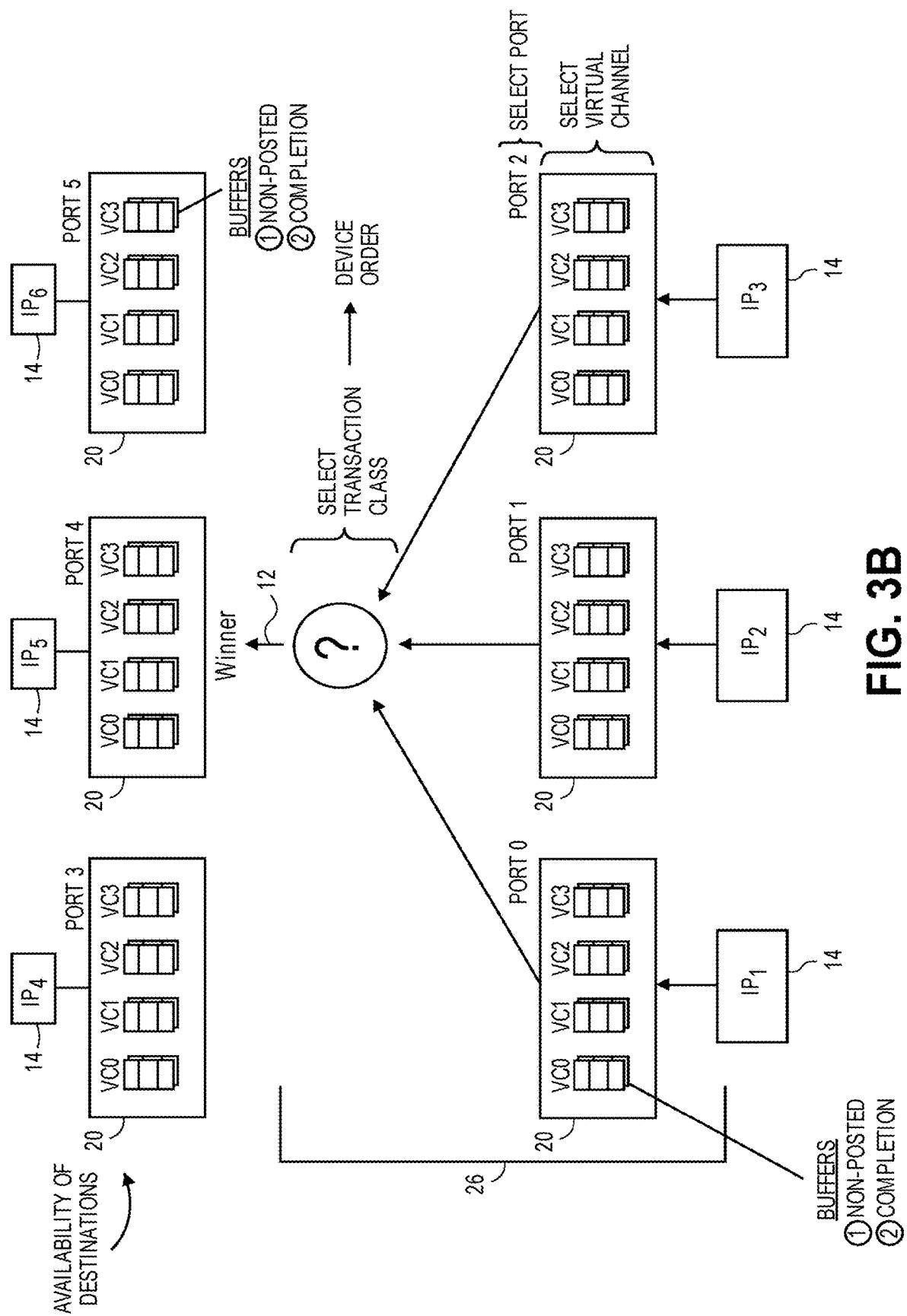
FIG. 3B is a logic diagram illustrating an arbitration element in accordance with a second non-exclusive embodiment.

Referring to FIG. 3B, a logic diagram illustrating the arbitration logic performed by the arbitration element 26 with Device ordering is shown. The arbitration process, and possibly the consideration of available destination resources, is essentially the same as described above, except for two distinctions.

First, with Device ordering, there are only two transaction classes defined, including (a) Non-posted read or write transactions where a response for every request is required and (b) Completion transactions, which defined the required responses. Since there are only two transaction classes, there are only two (2) buffers per virtual channel in each Port 20. For instance, with four (4) virtual channels (VC0, VC1, VC2 and VC3), each Port 20 (e.g., Port 0, Port 1 and Port 2) has a total of eight (8) buffers.

Second, the rules for selecting a Transaction for Device ordering are also different than PCI ordering. With Device ordering, there are no strict rules governing the selection of one class over the over class. On the contrary, either transaction class can be arbitrarily selected. However, common practice typically calls for favoring Completion transactions to free up resources that may not be available until a Completion transaction is resolved.

Otherwise, the arbitration process for Device order is essentially the same as described above. In other words for each arbitration cycle, the arbitration steps (1), (2) and (3) are performed, in any particular order, to select an arbitration winner. When the transaction class arbitration is performed, Device order rather than PCI order rules are used. In addition, the availability of destination resources and/or virtual channels may also be considered either prior to or intermediate any of the arbitration steps (1), (2) and (3).

Operational Flow Diagram

As previously noted, the above-described arbitration scheme can be used for sharing access to any shared resource and is not limited to use with just a shared interconnect. Such other shared resources may include the ARL 28, a processing resource, a memory resource such as the LUT 30, or just about any other type of resource that is shared among multiple parties vying for access.

Referring to FIG. 4, a flow diagram 40 illustrating operational steps for arbitrating access to a shared resource is shown.

In step 42, the various source sub-system agents 14 generate transactions. The transactions can be any of the three classes, including Posted (P), Non-posted (NP) and Completion (C).

In step 44, each of the transactions generated by the source sub-system agents 14 are packetized. As previously noted, packetization of a given transaction may result in one or multiple packets. The packets may also vary in size, with some packets having large payloads and others having small or no payloads. In situations where a transaction is represented by a single packet having a data payload 36 that is smaller than the width of the interconnect 12, the transaction can be represented by a single portion. In situations where a transaction is represented by multiple packets, or a single packet with a data payload 36 that is larger than the access width of the shared resource, then multiple portions are needed to represent the transaction.

In step 46, the portion(s) of the packetized transactions generated by each of the sub-system agents 14 are injected into the local switch 16 via its corresponding port 20. Within the port 20, the packet(s) of each transaction are assigned to a virtual channel. As previously noted, the assignment can be arbitrary, hard coded, based on balanced usage across all the virtual channels, security, urgency, etc.

In step 48, the portion(s) of the packetized transactions generated by each of the sub-system agents 14 are stored in the appropriate, first-in, first-out, buffer by both transaction class and by their assigned virtual channel (e.g., VC0, VC1, VC2 and VC3) respectively. As previously noted, virtual channels may be assigned by one of a number of different priority schemes, including strict or absolute priority, round-robin, weighted priority, least recently serviced, etc. If a given transaction has multiple portions, each portion will be stored in the same buffer. As a result, the multiple portions of a given transaction are transmitted over the same virtual channel associated with the interconnect 12. As transaction portions are injected, the corresponding a counter for tracking the number content items in each buffer is decremented. If a particular buffer is filled, its counter is decremented to zero, meaning the buffer can no longer receive additional contents.

In steps 50, 52 and 54, first, second and third level arbitrations are performed. As previously noted, the selection of a Port 20, a virtual channel and a transaction class can be performed in any order.

Element 56 may be used to maintain the rules used to perform the first, second and third levels of arbitration. In each case, the element 56 is used as needed in resolving each of the arbitration levels. For instance, element 56 may maintain PCI and/or Device ordering rules. Element 56 may also contain rules for implementing several priority schemes, such as strict or absolute priority, weighted priority, round robin, etc., and the logic or intelligence for deciding which to use in a given arbitration cycle.

In step 58, a winner of the arbitration is determined. In step 60, the winning portion is placed in a buffer used for accessing the shared resource and a counter associated with the buffer is decremented.

In step 62, the buffer associated with the winning portion is incremented since the winning portion is no longer in the buffer.

In step 64, the winning portion gains access to the shared resource. Once the access is complete, the buffer for the shared resource is incremented The steps 42 through 64 are continually repeated during successive clock cycles respectively. As different winning portions, each gains access to the shared resource.

Interleaving—Example One

Transactions can be transmitted over the interconnect 12 in one of several modes.

In one mode, referred to as the "header in-line" mode the header 34 of packet(s) 32 of a transaction are always transmitted first ahead of the payload 36 in separate portions or beats respectively. The header in-line mode may or may not be wasteful of the bits available on the interconnect 12, depending the relative size of the header 34 and/or the payload 36 with respect to the number of data bits N of the interconnect 12. For instance, consider an interconnect 12 that is 512 bits wide (N=512) and a packet having a header that is 128 bits and a payload of 256 bits. With this scenario, the 128 bits of the header are transmitted in a first portion or beat, while the remaining 384 bits of bandwidth of the interconnect 12 are not used. In a second portion or beat, the 256 bits of the payload 36 are transmitted, while the remaining 256 bits of the interconnect 12 are not used. In this example, a significant percentage of the bandwidth of the interconnect is not used during the two beats. On the other hand if the majority of the packets of transactions are the same size or larger than the interconnect, than the degree of wasted bandwidth is reduced or possibly eliminated. For example with headers and/or payloads that are 384 or 512 bits, the amount of waste is either significantly reduced (e.g., with 384 bits) or eliminated altogether (e.g., with 512 bits).

In another mode, referred to as "header on side-band", the header 34 of a packet is transmitted "on the side" of the data, meaning using the control bits M, while the payload 36 is transmitted over the N data bits of the interconnect 12. With the header on side band mode, the number of bits or size of the payload 36 of a packet 32 determines the number of beats needed to transmit the packet over a given interconnect 12. For instance, with a packet 32 having a payload 36 of 64, 128, 256 or 512 bits and an interconnect 12 having 128 data bits (N=128), the packet requires 1, 1, 2 and 4 beats respectively. With the transmission of each of the beat(s), the header information is transmitted over the control bits M along with or "on the side" of the data of the payload over the N data bits of the interconnect 12.

In yet another mode, the header 34 of packets 32 are transmitted in line with the payload, but there is no requirement that the header 34 and the payload 36 must be transmitted in separate portions or beats. If a packet 32 has a header 34 that is 128 bits and a payload 36 that is 128 bits, then the total size is 256 bits (128+128). If the N data bits of interconnect 12 is 64, 128, 256 or 512 bits wide, then a packet of 256 bits is transmitted in 4, 2, 1 and 1 beats respectively. In another example, a packet 32 has a header of 128 bits and a payload 36 of 256 bits, or a total packet size of 384 bits (128+256). With the same interconnect 12 of N data bits of 64, 128, 256 or 512 wide, the packet is transmitted in 6, 3, 2, or 1 beats respectively. This mode will always be as least as efficient or more efficient as the header in-line mode described above.

Figure 5:
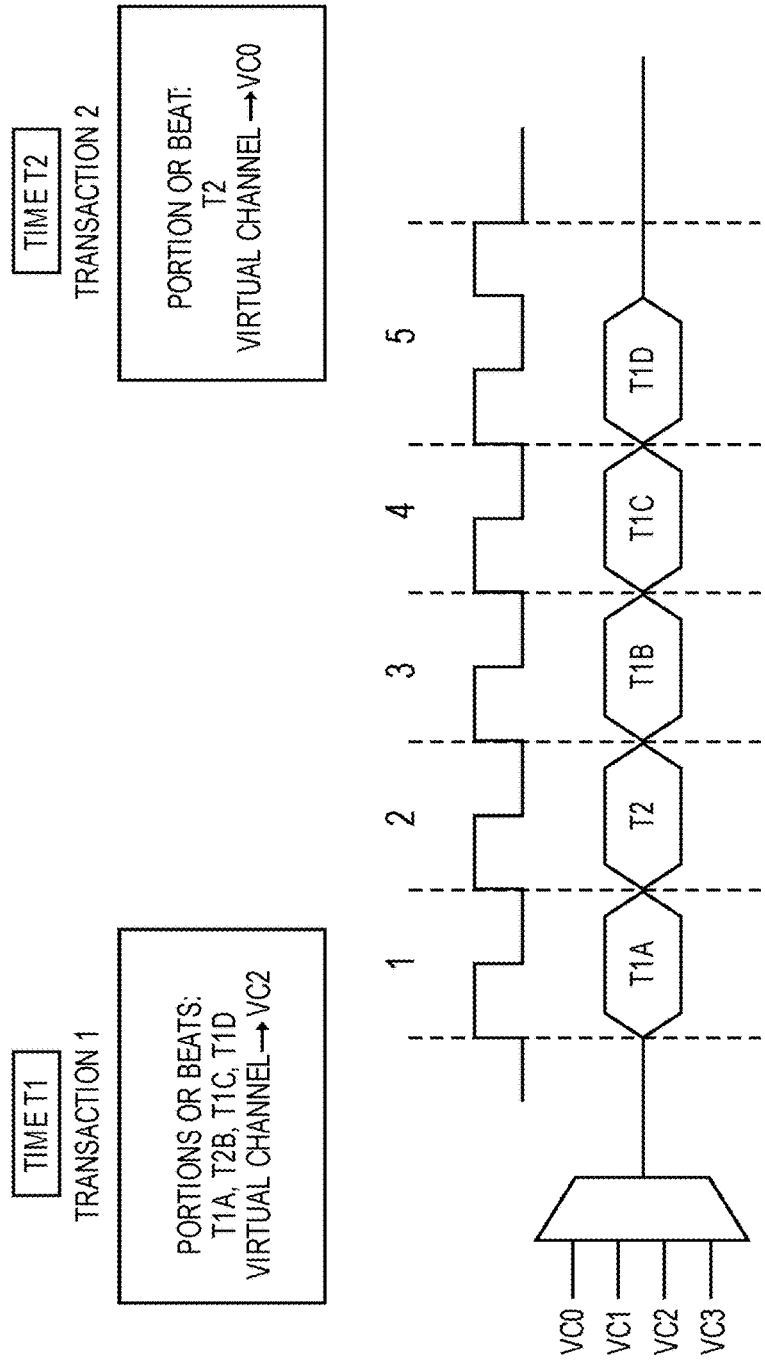
FIG. 5 illustrates a first example of the interleaving the transmission of portions of different transactions over virtual channels of the shared interconnect in accordance with a non-exclusive embodiment.

Referring to FIG. 5, a first example of the interleaving of portions of different transactions over multiple virtual channels is illustrated. In this example, for the sake of simplicity, only two transactions are defined. The two transactions are competing for access to shared interconnect 12, which is 128 data bits wide (N=128) in this example. The details of the two transactions include:

(1) Transaction 1 (T1), which was generated at Time T1 and which is assigned to virtual channel VC2. The size of T1 is four beats, designated as T1A, T1B, T1C and T1D; and (2) Transaction 2 (T2), which was generated at Time T2 (after Time T1) is assigned to virtual channel VC0. The size of T2 is a single portion or beat.

In this example, VC0 is assigned absolute or strict priority. Over the course of multiple cycles, the portions of the two transactions T1 and T2 are transmitted over the shared interconnect, as depicted in FIG. 5, as follows:

Cycle 1: Beat T1A of T1 is transmitted over VC2 because it is the only available transaction; Cycle 2: Beat T1B of T1 and the single portion of T2 are competing for access to the interconnect 12. Since VC0 has strict priority, T2 automatically wins. Accordingly, the beat of T2 is transmitted over VC0.

Cycle 3: Since there are no competing transactions, beat T1B of T1 is transmitted over VC2.

Cycle 4: Since there are no competing transactions, beat T1C of T1 is transmitted over VC2.

Cycle 5: Since there are no competing transactions, beat T1D of T1 is transmitted over VC2.

This example illustrates (1) with a virtual channel with absolute priority, access to the shared interconnect 12 is immediately awarded whenever traffic becomes available, regardless of whether or not other traffic has been previously waiting and (2) the winning portions or beats of different transactions are interleaved and transmitted over different virtual channels associated with the interconnect 12. In this example, virtual channel VC0 was given absolute priority. It should be understood that with absolute or strict priority schemes, any of the virtual channels may be assigned the highest priority.

Interleaving—Example Two

Figure 6:
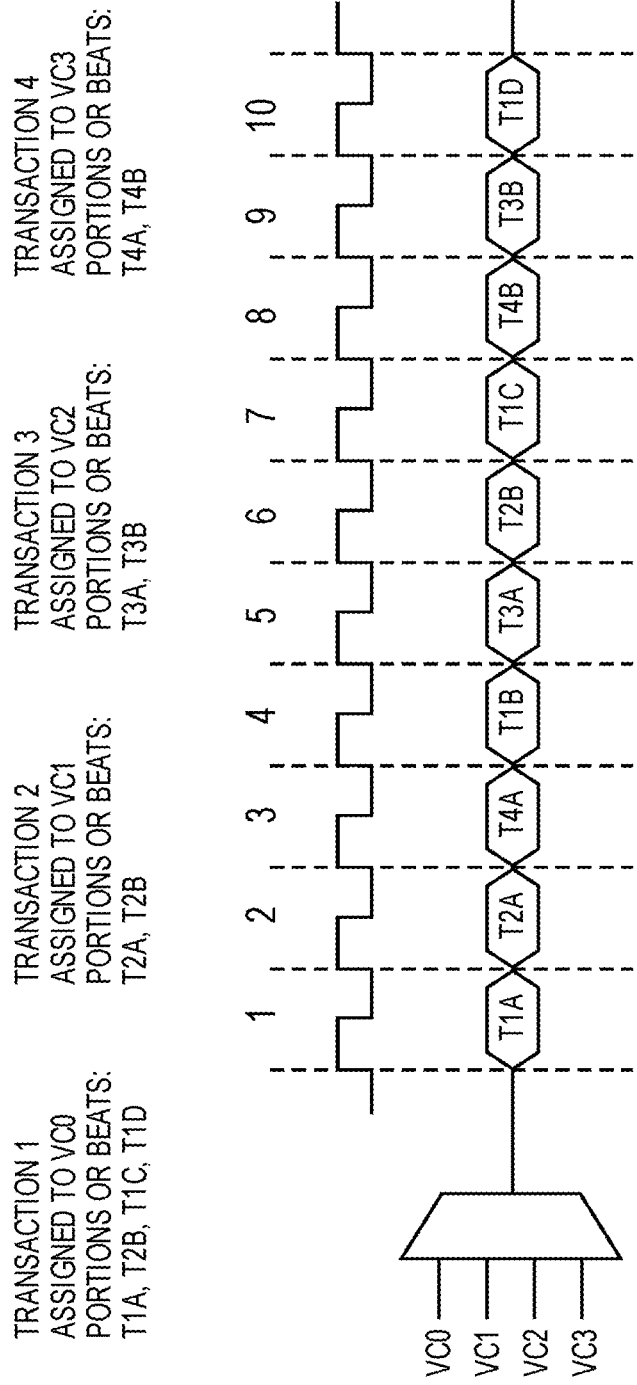
FIG. 6 illustrates a second example of the interleaving the transmission of portions of different transactions over virtual channels of the shared interconnect in accordance with a non-exclusive embodiment.

Referring to FIG. 6, a second example of the interleaving of portions of different transactions over multiple virtual channels is illustrated.

In this example, the priority scheme for access to the interconnect 12 is weighted, meaning VC0 is awarded access (40%) of the time and VC1-VC3 are each awarded access (20%) of the time respectively. Also, the interconnect is 128 bits wide.

Further in this example, there are four competing transactions, T1, T2, T3 and T4:
  T1 is assigned to VC0 and includes four (4) portions or beats T1A, T1B, T1C and T1D;
  T2 is assigned to VC1 and includes two (2) portions or beats T2A and T2B;
  T3 is assigned to VC2 and includes two (2) portions or beats T3A and T3B;
  T4 is assigned to VC3 and includes two (2) portions or beats T4A and T4B.

With this example the priority scheme is weighed. As a result, each virtual channel will win according to its weight ratio. In other words over the course of ten cycles, VC0 will win four times and VC1, VC2 and VC3 will each win two times. For instance, as illustrated in FIG. 6:
  The four portions or beats T1A, T1B, T1C and T1D of T1 are transmitted over VC0 in four (40%) of the ten (10) cycles (i.e., cycles 1, 4 7 and 10);
  The two portions or beats of T2A and T2B of T2 are transmitted over VC1 in two (20%) of the ten (10) cycles (i.e., cycle 2 and cycle 6);
  The two portions or beats of T3A and T3B of T3 are transmitted over VC2 in two (20%) of the ten (10) cycles (i.e., cycle 5 and cycle 9); and
  The two portions or beats of T4A and T4B of T4 are transmitted over VC3 in two (20%) of the ten (10) cycles (i.e., cycle 3 and cycle 8);
  This example thus illustrates: (1) a weighted priority scheme where each virtual channel is awarded access to the interconnect 12 based on a predetermined ratio and (2) another illustration of the winning portions of different transactions being interleaved and transmitted over different the virtual channels associated with the interconnect 12.

It should be understood with this weighted example there is sufficient traffic to allocate portions of transactions to the various virtual channels in accordance with the weighted ratios. If the amount of traffic on the other hand is insufficient, then the weighted ratios can be either strictly or not strictly enforced. For example, if there is a large degree of traffic on virtual channel VC3 and limited to no traffic on the other virtual channels VC0, VC1 and VC2, then VC3 will carry all or a bulk of the traffic if the weighted ratio is strictly enforced. As a result, however, the interconnect 12 may be under-utilized as portions of transactions may not be sent every clock cycle or beat. On the other hand if the weighted ratio is not strictly enforced, then it is possible for the transaction traffic to be reallocated to increase the utilization of the interconnect (e.g., traffic is sent over a higher number of cycles or beats).

The above two examples are applicable regardless which of the above-described transmission modes are used. Once transaction(s) is/are divided into portions or beats, they can be interleaved and transmitted over the shared interconnect 12 using any of the arbitration schemes as defined herein.

The above-described arbitration schemes represent just a few examples. In other examples, low jitter, weighted, strict, round-robin or just about any other arbitration scheme may be used. The arbitration schemes listed or described herein should therefore be considered as exemplary and not limiting in any manner.

Multiple Simultaneous Arbitrations

Up to now, for the sake of simplicity, only a single arbitration has been described. It should be understood, however, that in real-world applications, such as on a SoC, multiple arbitrations may occur simultaneously.

Figure 7:
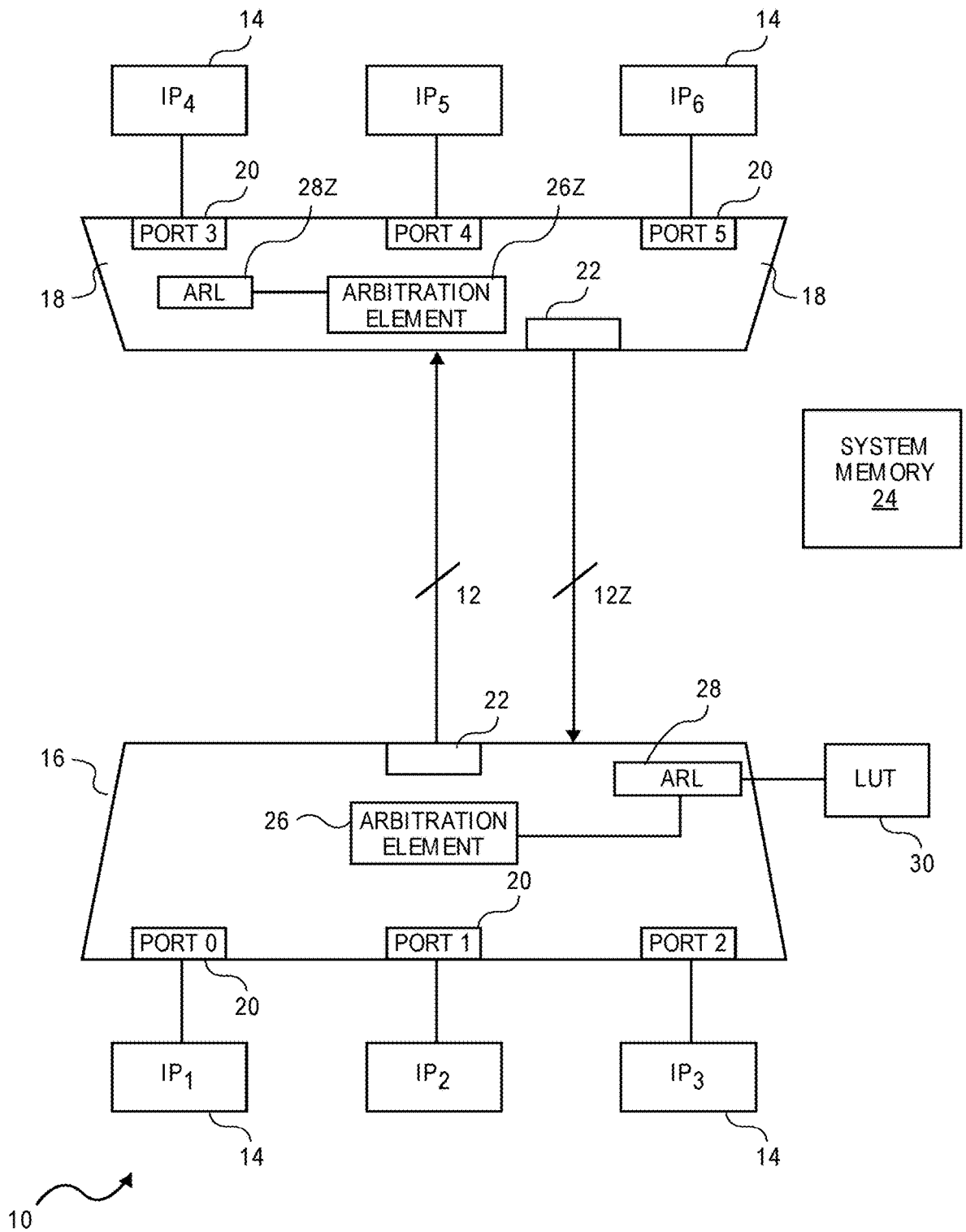
FIG. 7 illustrates is a block diagram of two shared interconnects for handling traffic in two directions in accordance with another non-exclusive embodiment of the invention.

Referring to FIG. 7, a block diagram of two shared interconnects 12 and 12Z for handling traffic in two directions between switches 16, 18 is illustrated. As previously described, the switch 16 is responsible for directing transaction traffic from source sub-functions 14 (i.e., $IP_1$, $IP_2$ and $IP_3$) to destination sub-functions 14 (i.e., $IP_4$, $IP_5$ and $IP_6$) over the shared interconnect 12. To handle transactional traffic in the opposite direction, switch 18 includes arbitration element 26Z and optionally ARL 28Z. During operation, elements 26Z and ARL 28Z operate in the complement of that described above, meaning transaction traffic generated by source IP agents 14 (i.e., $IP_4$, $IP_5$ and $IP_6$) is arbitrated and sent over shared interconnect 12Z to destination IP agents (i.e., $IP_1$, $IP_2$ and $IP_3$). Alternatively, the arbitration can be performed without the ARL 28Z, meaning the arbitration simply decides among competing ports 20 (e.g., Port 3, port 3 or Port 5) and the portion of the transaction associated with the winning port is transmitted over the interconnect 12, regardless of the final destination of the portion. As elements 12Z, 26Z and 28Z have previously been described, a detailed explanation is not provided herein for the sake of brevity.

In a SoC, there can be multiple levels of sub-functions 14 and multiple shared interconnects 12. With each, the above described arbitration scheme can be used to arbitrate among transactions sent over the interconnects 12 between the various sub-functions simultaneously.

IP Agent Reset and Power Management

Figure 8:
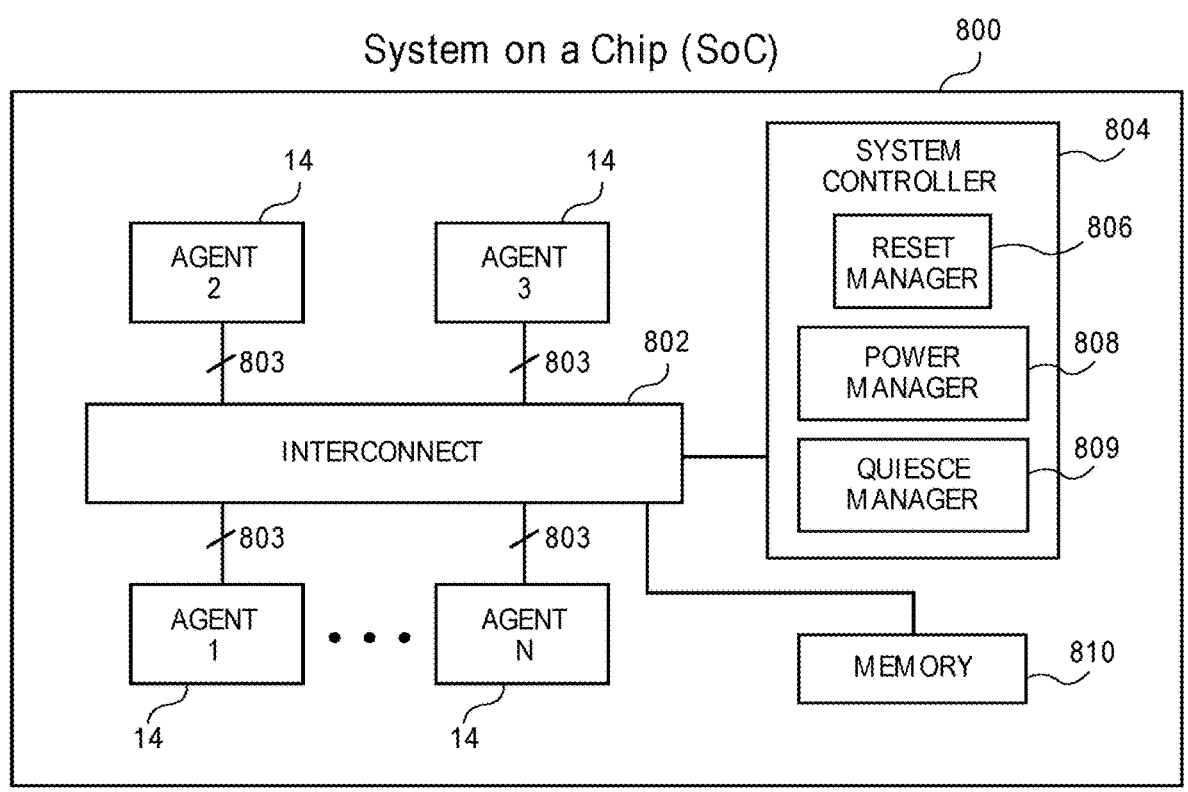
FIG. 8 illustrates a block diagram of an SoC having reset, power management and quiesce functionality in accordance with a non-exclusive embodiment of the invention.

Referring to FIG. 8, a block diagram of an SoC 800 having reset and power management functionality is illustrated. The SoC 800 includes an interconnect 802, a plurality of IP agents 14 (e.g., Agent 1 through Agent N), one or more links 803 connecting or coupling the IP agents 14 to the interconnect 802, and a system controller 804. Although not illustrated, each IP agent 14 may also include one or more dedicated "hard-wire" inputs for receiving reset input instructions. Such instructions may come from a number of sources, including from off the SoC, the system controller 804, or another IP agent 14, etc.

In various embodiments, the IP agents 14 may be disparate and may implement a wide variety of different functions.

The interconnect 802 can be a wide variety of different types of interconnects, such a Network on a Chip (NoC), a bus, a switching network, etc.

In various embodiments, the links 803 may each be a dedicated link or a bus between each IP agent 14 and the interconnect 802. Alternatively, access to the interconnect 802 can be shared among multiple IP agents 14 using one link 803 and an arbitration scheme is used to select among the competing IP agents 14. In yet another embodiment, a number of virtual channels may be associated with the one or more links 803, such as the virtual channels associated with the shared link as previously described.

The system controller 804 and the managers 806, 808 and 809 may also be implemented in a number of different ways. For instance, as a CPU or microcontroller, as programmable logic, a complex state machine for handling all or most system control functions on the SoC 800, a simple state machine for handling a few exception situations, or any combination thereof. The system controller 804 may reside on the SoC 800 as shown or, alternatively, located off the SoC 800 (not illustrated). Where a state machine is used, the states and the transitions between the states is typically hard-coded into the SoC 800.

In yet other embodiments, one or more of the reset, power and/or quiesce managers 806, 808 and 809 can each be centralized within the system controller 804 as shown. Alternatively, each manager 806, 808 and/or 809 can be decentralized and distributed throughout various locations on the SoC 800 or even off the SoC. Each of the reset manager 806, the power manager 808 and the quiesce manager 809 can be implemented in software, hardware, programmable logic, a state machine or any other suitable means.

The reset manager 806 is responsible for managing the emergence of the various IP agents 14 on the SoC 800 from reset in an organized manner A reset of an IP agent 14 may be required or desired under a number of circumstances. For instance, a "cold reset" occurs following removal or disruption of power provided to the SoC 800 or a system wide reset of the SoC 800. Alternatively, a "warm reset" occurs when one, a group or even all the IP agents 14 (similar to a cold reset) are reset, but power is not removed or disrupted from the SoC 800. A warm reset can be implemented via signaling that originates either on the SoC 800 or externally. Regardless of how a reset is initiated, the reset manager 806 is responsible for managing the emergence of the IP agent 14 or IP agents 14 from reset in an organized manner.

If an IP agent 14 is malfunctioning for some reason, it may have to be reset. Examples of malfunctioning IP agents 14 include situations where the IP agent 14 is non-responsive, is in an error state, or actively generating erroneous transactions. In yet other examples, an IP agent 14 may have to undergo a reset operation upon exiting a lower power state, such as one of several power saving modes as described below.

The power manager 808 manages the process of placing the various IP agents 14 into a lower power state, typically one of several power saving modes. Depending on the mode, the power manager 808 may operate in cooperation with the reset manager 806 to reset an IP agent 14 if necessary.

The quiesce manager 809 operates in cooperation with the system controller 804, reset manager 806, power manager 808 and the interconnect 802 to (1) transition an operational or malfunctioning IP agent 14 into either a reset or a power savings mode where the IP agent becomes inoperable, (2) places the link 803 between the interconnect and the IP agent 802 into a quiescent state and (3) directs the interconnect to operate as a proxy for the IP agent while inoperable.

The memory 810 may include both volatile and non-volatile types of memory. In addition, the memory 810 may be centralized on the SoC 800 or may be widely distributed among the system controller 804, the interconnect 802, the links 803, and any of the managers 806, 808 and/or 809. In yet other embodiments, portions or all of the memory 810 may be provided off the SoC 800.

The volatile portions of the memory 810 are typically used for system memory, where the current data generated by the system controller 804, managers 806, 808, 809, interconnect 802, IP agents 14, etc., are stored. Such memory may include various caches, SRAM, DRAM, etc.

The non-volatile or persistent portions of memory 810 is typically used for storing "boot-up" code for the SoC 800. The boot code enables the system controller 804, including the managers 806, 808, 809, the interconnect 802 and the IP agents 14, to each load their operating systems and/or other system software as needed to initiate operation after powering on. The reboot process typically includes a number of self-tests, which when completed, allow the entire system, including each of the IP agents 14, to perform their normal operations. The non-volatile or persistent portions may be implemented using NVRAM (non-volatile random-access memory), EEPROM (electrically erasable programmable read only memory), a hard drive, CD ROM, etc.

The reset manager 806 is responsible for coordinating the emergence from reset of any of the IP agents 14 in an organized manner. As noted herein, a reset of a given IP agent 14 may occur for any number of reasons, including (1) when the entire SoC 800 emerges from reset following an external reset, a re-start command or a power-on event or (2) or an individual IP agent 14 reset during operation of the SoC 800 due to malfunction, following a power down or sleep mode, etc. Regardless of the reason, a given IP agent 14 is ready to be introduced to the interconnect 802 once its internal reset sequence is complete. Upon emergence from reset, a negotiation is then coordinated between the IP agent 14 and its IP port 20 on the interconnect 802 over the link 803.

Figure 9:
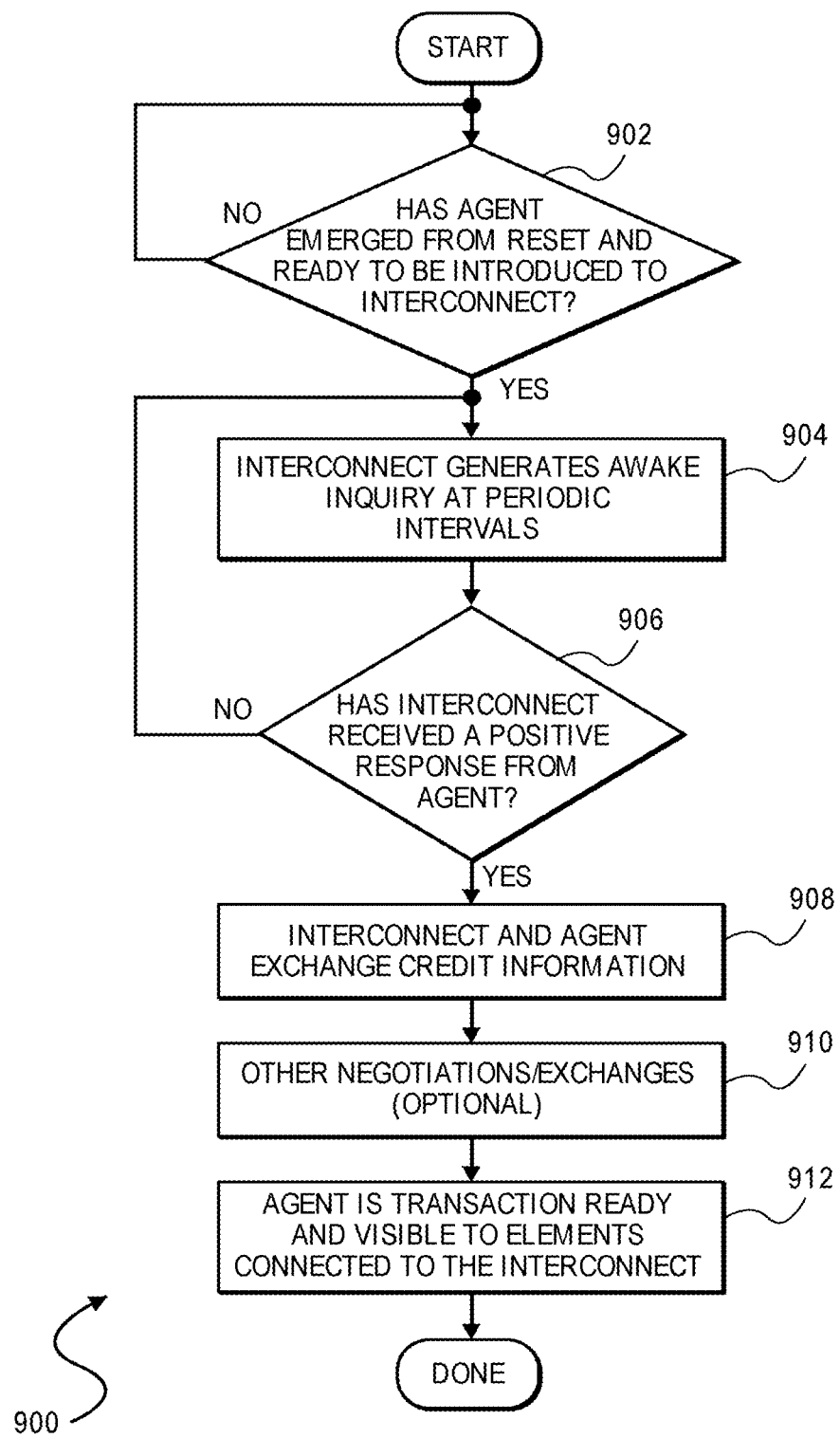
FIG. 9 is a flow diagram showing an IP agent reset sequence in accordance with a non-exclusive embodiment of the invention.

Referring to FIG. 9 is a flow diagram showing an exemplary IP agent reset negotiation sequence between an IP agent 14 and the interconnect 802.

In the initial step 902, a determination is made if an IP agent 14 has emerged from reset and is ready to be introduced to the interconnect 802 or not. When emergence occurs, the subsequent steps 904 through 912 are followed to reintroduce the IP agent 14 to the interconnect 802.

In step 904, the interconnect 802 generates inquires for the IP agent 14 at periodic intervals. With each inquiry, the interconnect 802 essentially asks the IP agent 14 if it is "awake" (i.e., is it transaction ready, meaning is it capable of sending or processing received transactions).

In decision 906, the interconnect determines if it has received a positive response to the inquiry(s) from the IP agent 14. If not, then the interconnect 802 continues to send the inquiries. If yes, then it signifies to the interconnect 802 that the IP agent 14 has partially completed its reset routine and is ready for the next phase of the negotiation.

In step 908, the interconnect 802 and the IP agent 14 continue their negotiation by exchanging their credit information respectively. The interconnect 802 and the IP agent 14 each exchange with the other the available number of beats (i.e., the amount of data that can be transmitted over the link 803 per clock cycle. Each partner on opposing sides of the link 803, after the exchange, knows the available number of credits the other has as a result of this negotiation.

In an optional step 910, interconnect 802 and the IP agent 14 continue their negotiation by exchanging other useful information such as security credentials, an agreed upon number of virtual channels that may be associated with the link 803 coupling the interconnect 802 and the IP agent 14, etc.

In the last step 912, when the negotiation is complete, the IP agent 14 is declared "transaction ready". In other words, the IP agent is ready to either process incoming transactions received from the interconnect 802 or to send outgoing transactions over the interconnect 802 to another destination. Once the IP agent 14 is transaction ready, it becomes visible to both the interconnect 802, the system controller 804 and any other element connected or otherwise coupled to the interconnect 802, either directly or indirectly through intermediate circuitry, logic or other element.

The reset manager 806 is also responsible for coordinating the reset of malfunctioning IP agents 14. During operation of the SoC 800, an IP agent 14 may misbehave (e.g., become non-responsive, enter an error state, erroneously generate transactions, or otherwise malfunction). For instance, the IP agent may be unable to process a received transaction. As a result, the originating IP agent that sent the transaction may get hung up waiting for a response. Depending on the severity of the problem, the hang up can be limited to just the originating IP agent 14, the destination IP agent 14, or in a worst case scenario, other portions or even the entire SoC 800 may be adversely affected. Accordingly, in certain circumstances, the misbehaving IP agent may need to be reset to correct the issue.

Figure 10:
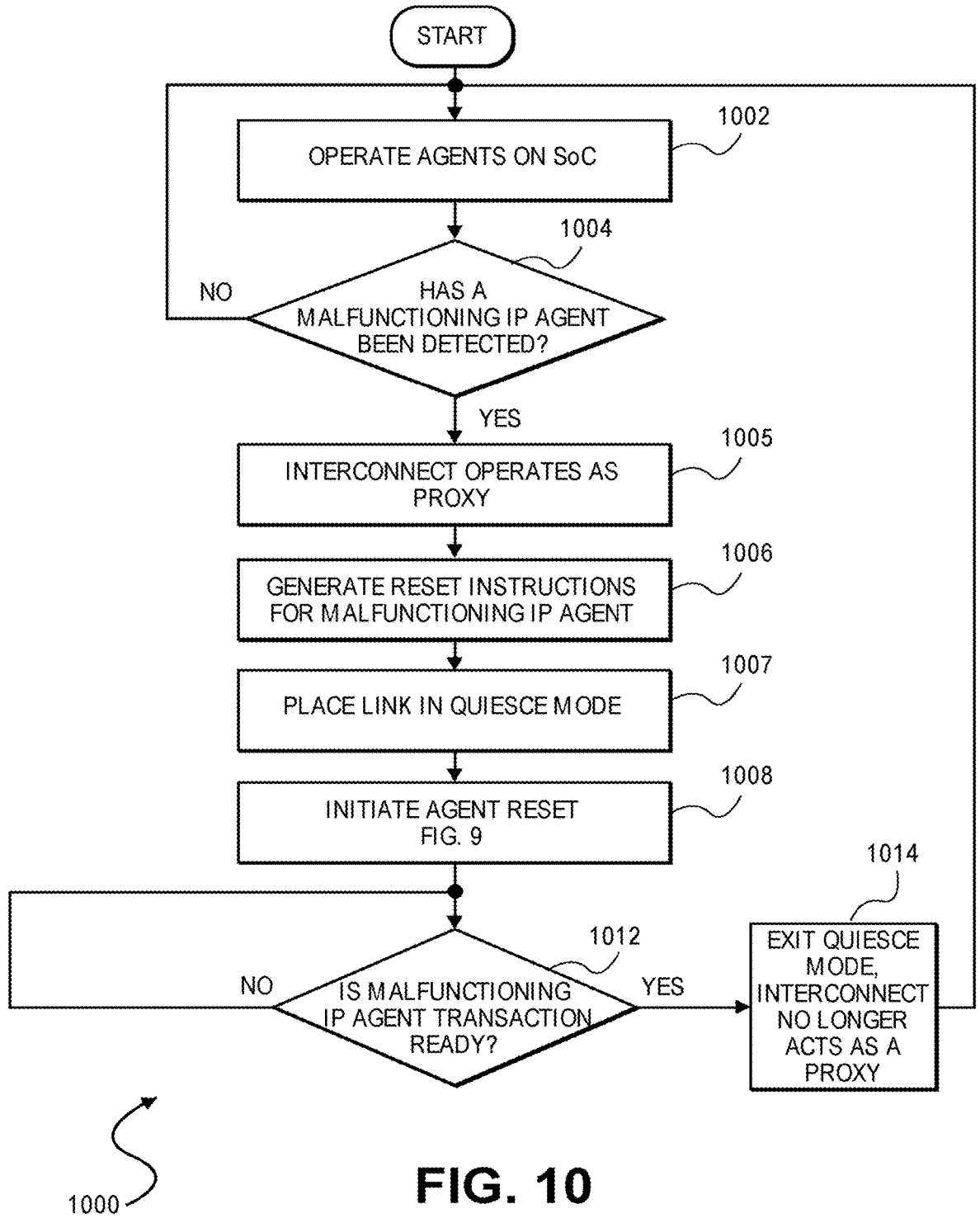
FIG. 10 is a flow diagram showing a reset sequence for a malfunctioning IP agent in accordance with a non-exclusive embodiment of the invention.

Referring to FIG. 10, a flow diagram 1000 showing a reset sequence for a malfunctioning IP agent is shown.

In step 1002, the various IP agents 14 on the SoC 800 operate as normal by generating transmitted transactions and/or processing received transactions.

In decision step 1004, the system controller 804 monitors the operation of the IP agents. If no problems are detected, then the IP agents 14 continue their normal operation. On the other hand if an IP agent malfunctions, for any reason, then the reset manager 806 flags it as a malfunctioning IP agent 14.

In step 1005, the system controller 804 and interconnect 802 further cooperate to initiate a number of processes that help the remainder of the SoC 800 operate without further issues or problems. These additional processes may include:
1. The system controller 804 requests that the interconnect 802 disallow any further transactions from being generated by the malfunctioning IP agent 14;
2. 2. Keeping track of outstanding transactions targeting the malfunctioning IP agent 14;
3. 3. The interconnect 802 may act as a proxy and respond to any transactions targeted for the malfunctioning IP agent 14 while undergoing the reset negotiation process. For example, the interconnect 802 may generate an exception message in response to the non-processed transaction. By acting as a proxy, potentially much larger system wide issues are avoided, including the entire system getting hung up because the sender of the transaction never received a response from the malfunctioning IP agent 14. In various embodiments, the exception message may be a number of different types, such as the IP agent 14 is not available, the IP agent is in a low power mode, etc. In general, a wide variety of different types of exception messages may be used, each indicative of the condition or error that has occurred.

In step 1006, the reset manager 806 generates a reset instruction for the malfunctioning IP agent 14.

In 1007, the link 803 between the IP agent 14 to be reset and the interconnect 802 is placed in a quiescent state. This process is further described with regard to FIG. 14.

In step 1008, the malfunctioning IP agent 14 initiates its reset routine in response to the instruction received over the interconnect 802 or which may be received via a dedicated reset wire. This process involves the IP agent 14 (1) executing its own reset protocol or routine and (2) negotiating with the interconnect 802, as described above with regard to FIG. 9.

In decision step 1012, it is determined if the reset negotiation of the IP agent 14 is complete. When complete, control returns to step 1002 and operation of the IP agents 14 and the SoC 800 resume as normal. As noted above, the reset IP agent 14 becomes visible to the interconnect 802 and the system controller after emerging from the reset and becomes transaction ready. Finally, in step 1014, the link 803 between the now reset IP agent 14 and the interconnect 802 exits the quiescent mode. At this point, the interconnect 802 no longer needs to act as a proxy for the IP agent 14.

The power manager 808 is responsible for intelligently and selectively placing IP agents 14 into a lower power state, by placing the IP agents 14 in one of several power down modes. The powering down or placing of IP agents 14 into a powered down mode can be performed for a variety of reason.

For example, if the SoC 800 is used in a battery powered device, the power manager 808 may place IP agents into a power down mode to preserve limited battery power. Alternatively, even in non-battery powered devices, the power manager 808 may place non-critical IP agents 14 into a low power mode to prevent overheating. These are just a few of the possible reasons for implementing power management. Other reasons may include placing one or more IP agents 14 in a power down mode if they are not being used. In various alternative embodiments, the power down modes include:
1. Low Power Mode, Operational: In one alternative, the clock frequency for the IP agent 14 is slowed down if applicable. Alternatively, the supply voltage may be reduced if applicable. In yet another embodiment, both the clock frequency and supply voltage may be reduced if applicable further reducing power consumption. It should be understood that reducing the clock frequency and/or supply voltage is done only when applicable, meaning not all IP agents 14 have the ability to operate at either a reduced clock frequency, a reduced supply voltage, or both. In yet other embodiments, the commands for reducing the clock and/or supply voltage, when applicable, can be derived from the system controller 804 or the IP agent 14 itself, provided the IP agent 14 has a low power, operational mode.

Since the IP agent remains functional, the interconnect 802 may not play a significant role in this mode, meaning it may not have to act as a proxy for the IP agent 14 and generate responses for incoming transactions since the IP agent 14 can generate the response itself. However, the system controller 804 and/or interconnect 802 may reconfigure the link 803 settings for the IP agent 14 since its performance capability may be reduced while operating at the lower clock frequency. The setting(s) that may possibly be changed include the arbitration settings for the IP agent 14 or the possible a reduction in the count of permitted outstanding transactions. When the IP agent exits this Low Power Mode, the voltage is first increased (if decreased) followed by an increase in the clock frequency (if decreased) and any changes to the link 803 settings reverted back to normal operational mode (if reconfigured).

2. Low Power, Inoperable Mode, State Information Maintained: In this mode, the clock is shut off and the power supply is reduced, but may not turned off completely. As a result, state information maintained in memory in the IP agent 14 is retained. Prior to entering this mode, the interconnect 802 "drains" the transactions that the IP agent has already issued by preventing new transactions from being initiated and waiting for outstanding transactions to complete. Once all the transactions are drained, the interconnect 802 may act as a proxy and perform similar processes (1), (2) and (3) as described above with regard to the resetting of a malfunctioning IP agent 14. When the IP agent is returned to normal and exits this mode, the voltage is first increased followed by an increase in the clock frequency.

3. Low Power, Inoperable, Mode—No State Information Retained: This mode is similar to mode 2 described immediately above, except the power is reduced to a point where state information maintained in the IP agent is lost. The interconnect 802 operates as a proxy as discussed above in this mode as well. When powered back up, the IP agent is required to go through a reset negotiation process, similar to that as described above with regard to FIG. 9.

4. Power Off Mode: In this mode, the clock is turned off and power is completely removed. The interconnect 802 operates as a proxy as discussed above. Upon power up, the supply voltage is first ramped up followed by the reset negotiation process as described above with regard to FIG. 9.

Figure 11:
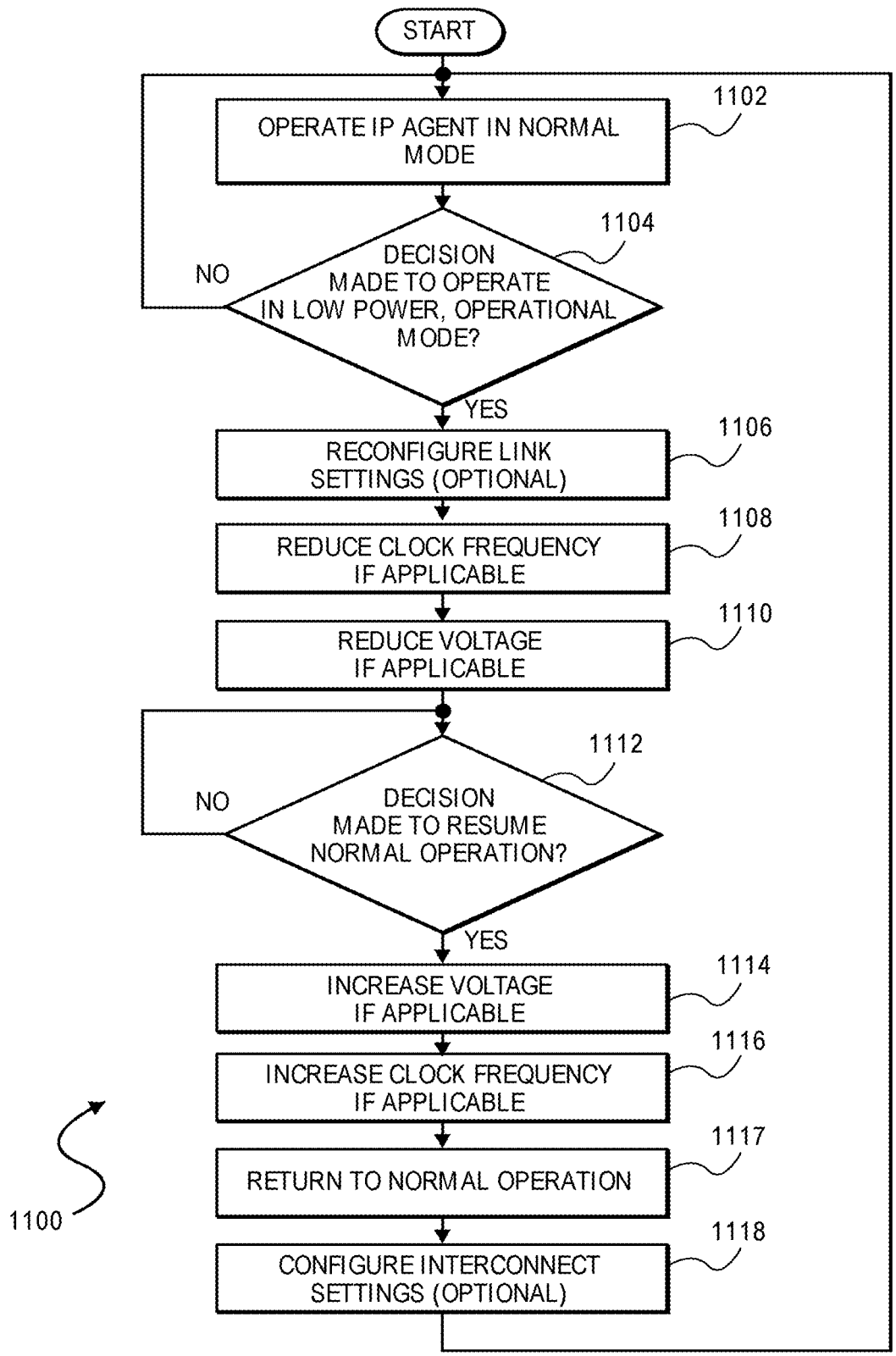
FIG. 11 is a flow diagram illustrating a power down/up sequence for an IP agent in accordance with a non-exclusive embodiment of the invention.

FIG. 11 is a flow diagram 1100 illustrating a sequence for placing an IP agent 14 in and out of the Low Power, Operational Mode.

In the initial step 1102, the IP agent 14 on the SoC 800 operates in its normal mode, meaning the standard clock frequency and voltage are used.

In decision step 1104, conditions within the SoC 800 are monitored by the system controller 804. If operating conditions are relatively normal or no event occurs triggering a power down of the IP agent 14, then the SoC and IP agent 14 continues to operate in its normal mode per step 1102. However, if a trigger condition is met (e.g., a reduced battery supply, overheating, etc.), then the power manager 808 may elect to place the IP agent 14 into the low, power operational mode.

In an optional step 1106, the interconnect 802 may elect to reconfigure the link 803. The reconfiguration may include changing the arbitration settings for the IP agent 14 or reducing the count of possible outstanding transactions to take into account the lower processing capability of the IP agent when operating at the lower power mode.

In step 1108, the operating clock frequency of the IP agent 14 is reduced if applicable. With the reduced clock frequency, the IP agent consumes less power.

In step 1110, the voltage supplied to the IP agent is reduced if applicable. By reducing the voltage, further power savings can be realized.

With the clock frequency and/or the voltage reduced, the IP agent 14 remains operational. As a result, it is capable of processing transactions, although possibly at a slower rate when operating at its standard clock frequency and/or supply voltage. In optional embodiments, the interconnect 802 can act as a proxy as described above or can be adjusted or reconfigured to take into account and support the lower rate of performance of the IP agent 14 in the low power mode. Since these alternatives are optional, they do not necessarily have to be implemented.

In decision step 1112, the IP agent 14 operates in the low power mode until a decision is made to resume normal operation. In which case, the IP agent 14 undergoes a sequence to resume normal operation.

In optional step 1114, the voltage is increase to the standard operating voltage if applicable (i.e., if the voltage was previously decreased).

In step 1116, the clock frequency is increased if applicable (i.e., provided the clock was previously decreased. In step 1117, the IP agent returns to normal operation.

Finally, in optional step 1118, the interconnect returns any reconfigured interconnect setting to normal. At this point, the IP agent is ready to resume normal operation, as provided in step 1102.

Figure 12:
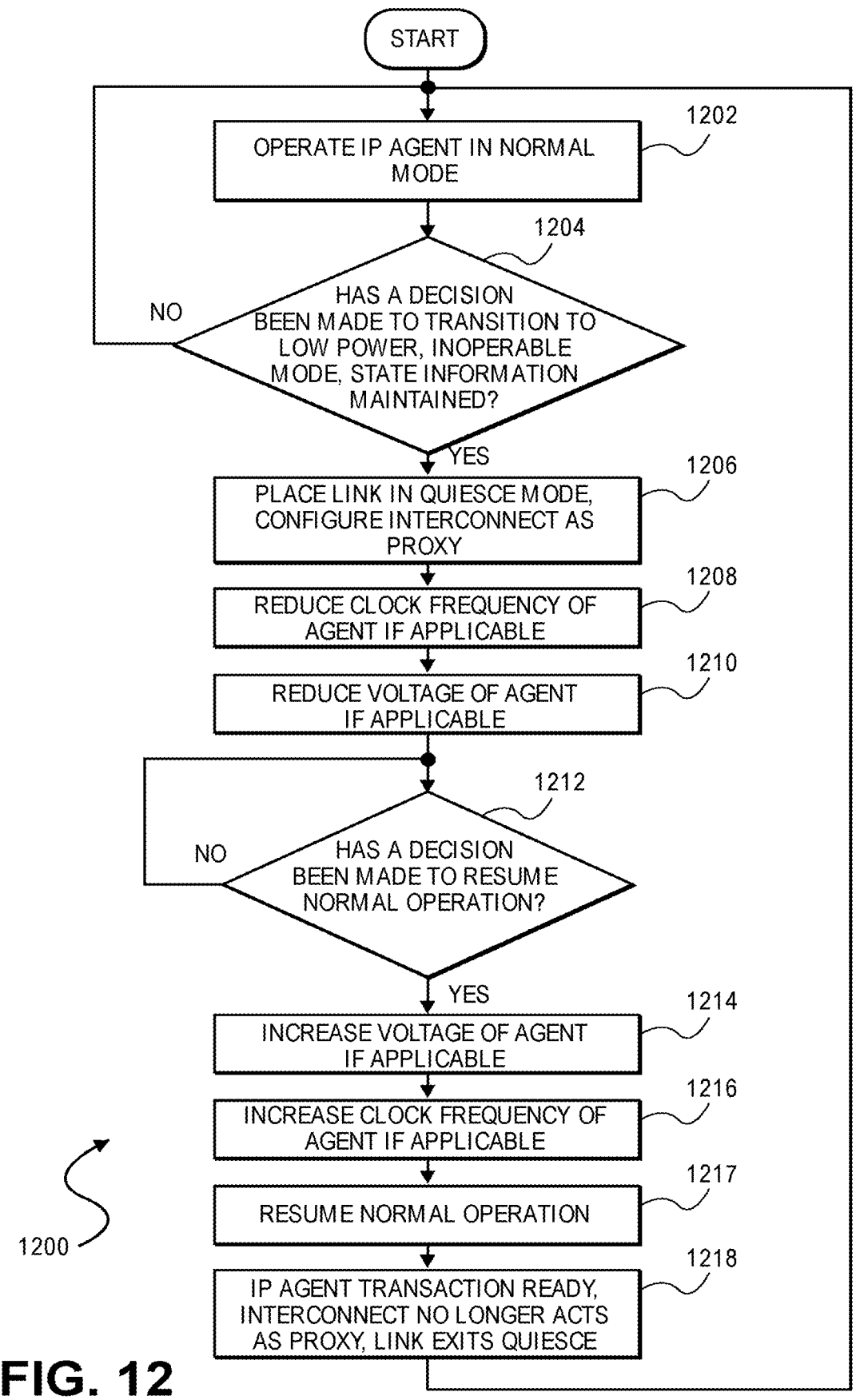
FIG. 12 is a flow diagram illustrating a power down/up sequence for an IP agent in accordance with a non-exclusive embodiment of the invention.

Referring to FIG. 12, a flow diagram 1200 illustrating a sequence for powering down/up an IP agent 14 in the Low Power, Inoperable, State Information maintained mode is illustrated.

In step 1202, the IP agent 14 operates in its normal mode.

In step 1204, a decision is made to operate the IP agent 14 in low power, inoperable, state information maintained mode.

In step 1206, the link 803 is placed in the quiescent state and the interconnect 802 is configured to operate as a proxy for the IP agent 14. This typically involves (1) disallowing any new transactions from being generated by the IP agent 14, (2) waiting for any outstanding transactions to complete and then (3) acting as a proxy by responding to any transactions targeted for the IP agent 14. For example, the interconnect 802 may send an exception message to the source of the non-processed transaction, possibly preventing a hang up situation from occurring because the sender of the transaction never received a response from the IP agent 14.

In step 1208, the clock frequency of the IP agent 14 is reduced if applicable.

In step 1210, the operating voltage of the IP agent 14 is reduced if applicable. However, the voltage remains adequate so that memory or storage elements in the IP agent 14 maintain their state information.

In decision 1212, the IP agent 14 remains in the lower power state until a decision has been made to resume normal operation. The system controller 804, an event external to the SoC (e.g., a signal received from a sensor, signal received an external source, etc.), a timer, the IP agent itself or another IP agent, can all trigger the wake-up. When this decision is made, the IP agent undergoes a sequence to resume normal operation.

In steps 1214 and 1216, the voltage and clock frequency provided to the IP agent 14 are each increased if applicable. Since the state information has been retained, the IP agent 14 resumes normal operation in step 1217.

In step 1218, link 803 exists the quiescent mode and the IP agent becomes transaction ready and the interconnect 802 is notified that it longer has to act as a proxy.

Figure 13:
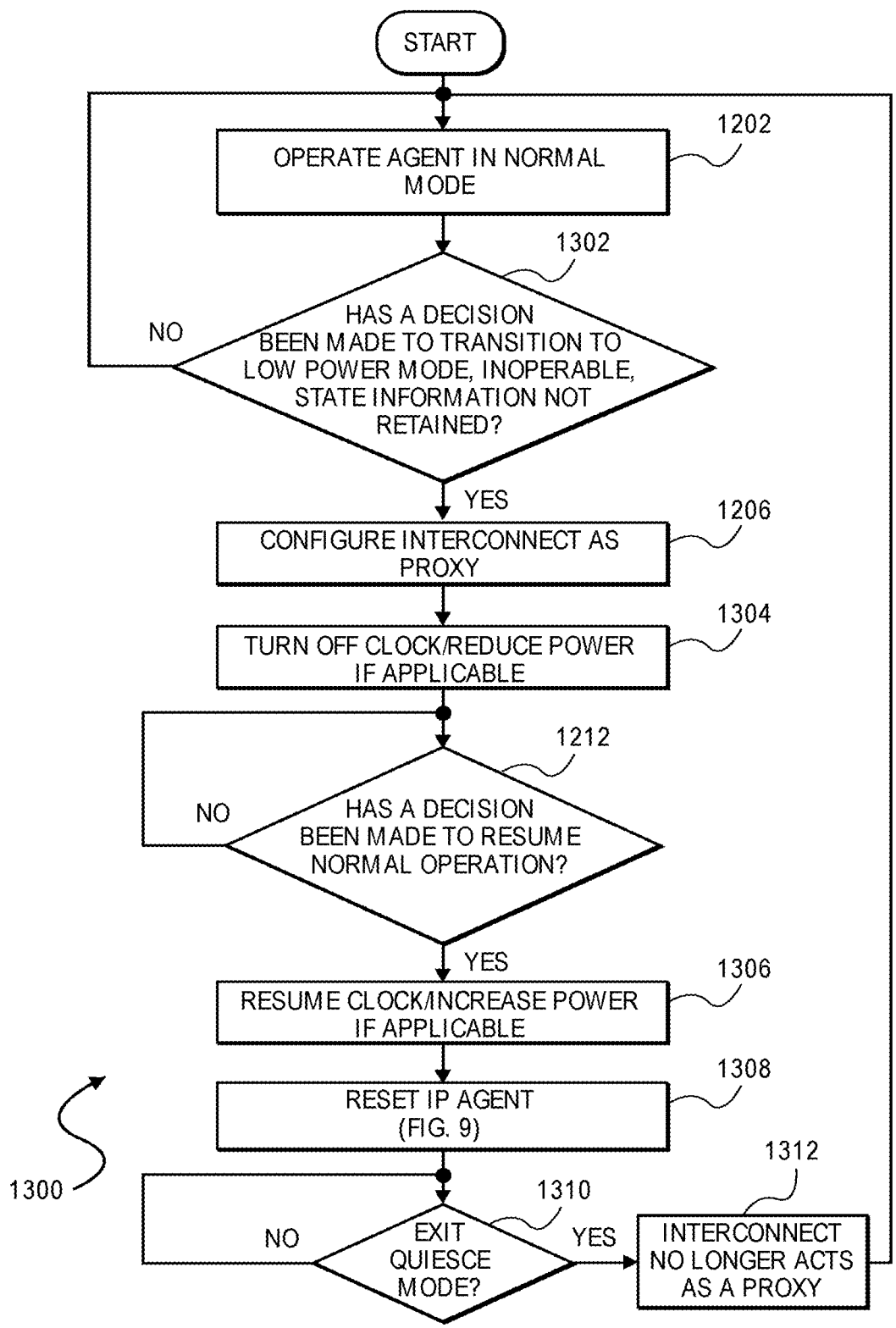
FIG. 13 is a flow diagram illustrating a power down/up sequence for an IP agent in accordance with a yet another non-exclusive embodiment of the invention.

Referring to FIG. 13, a flow diagram 1300 illustrating a sequence for the Low Power, Inoperable, Mode is illustrated. In this sequence, steps 1202, 1206 and 1212 are the same as described above with regard to FIG. 12. As such, a discussion of these steps are not repeated herein.

In steps 1302, a decision is made to power down the IP agent 14. Thereafter, the interconnect is configured as a proxy (step 1206) and the clock for the IP agent 14 is turned off completely (if applicable) and/or the voltage is significantly reduced (if applicable) to the point where state information is lost in step 1304. Without state information, when a decision is made to resume normal operation per step 1212, the voltage is ramped up (if applicable) and clock turned on (if applicable) in step 1306. Thereafter, the IP agent 14 undergoes a reset operation, as previously described with regard to FIG. 9. Once the reset is complete, the IP agent 14 becomes transaction ready. The system then waits for the link to exit the quiescent mode in step 1310. Once the exit occurs, the IP agent is visible on the interconnect 802. Thereafter, in step 1312, the interconnect 802 no longer acts as a proxy for the IP agent 14.

Finally, for the Power Off Mode, the sequence is the same as FIG. 13, except the power is turned off completely, as opposed to simply reduced. Otherwise the Power Off Mode sequence is the same. In this mode, the IP agent 14 consumes virtually no power, is inoperable, and the interconnect 802 may act as a proxy on behalf of the IP agent.

Figure 14:
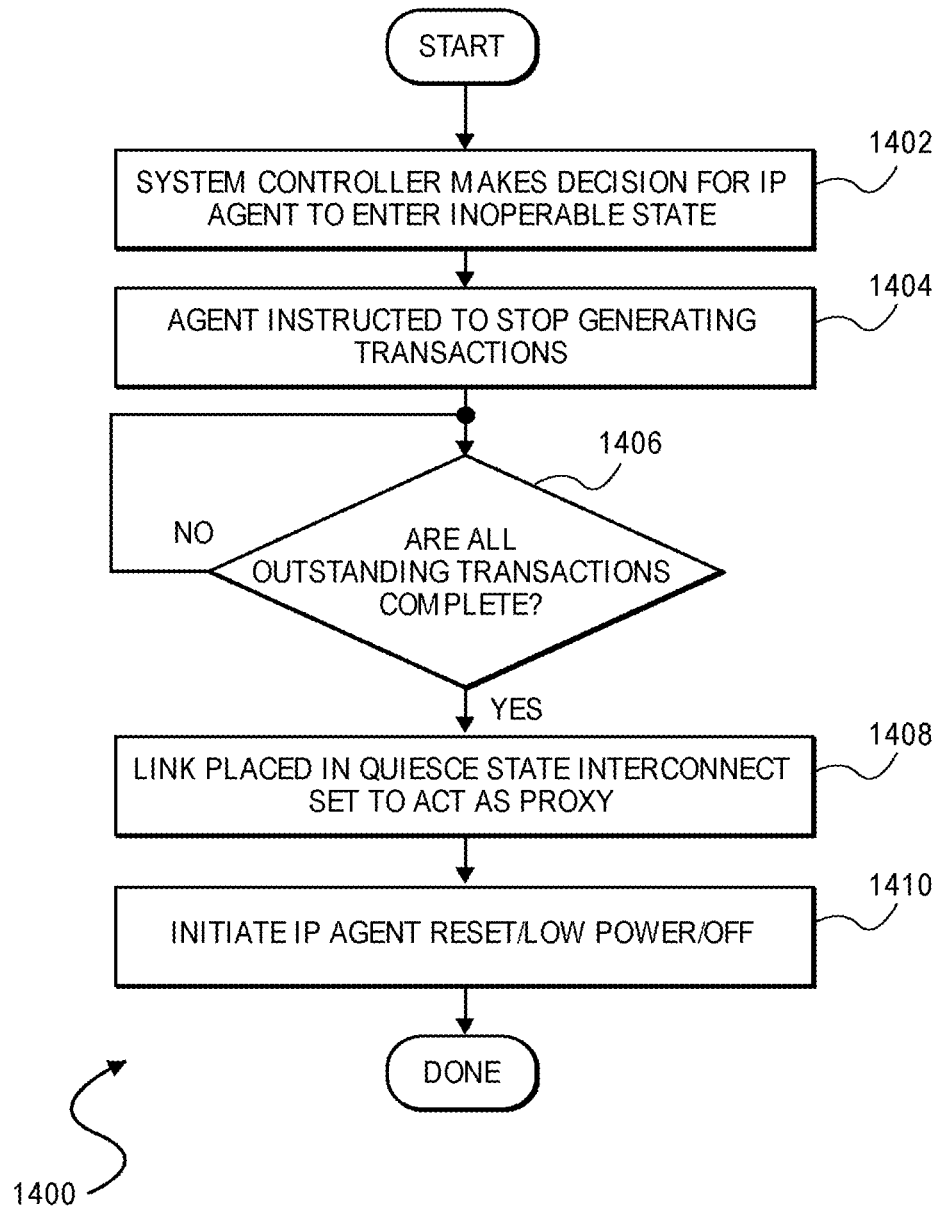
FIG. 14 is a flow chart illustrating the steps for placing a link in a quiescent state.

Referring to FIG. 14, a flow chart 1400 illustrating the steps for placing a link 803 in the quiescent state is illustrated.

In the initial step 1402, the system controller 804 makes a decision that an IP agent 14 should be either reset or placed in one of the inoperable power saving modes.

In step 1404, the IP agent 14 is instructed to stop generating transactions.

In decision 1406, the system determines if all outstanding transactions are complete. For all outstanding Non-posted transactions, a Completion transaction must be received (i.e., with read transactions, the accessed data must be returned, with non-posted write transactions, an acknowledgement must be received). With Posted transactions, no response transaction is required. Posted transactions are therefore considered "complete" once they are sent by the IP agent.

In step 1408, the link 803 is placed in the quiescent state when all the outstanding transactions are complete. Thereafter, the interconnect 802 is configured as a proxy for the IP agent 14.

In step 1410, the IP agent is ready to placed in either reset or the desired inoperable low power mode.

FIGS. 15A-15D show flow diagrams of various for IP agent "wake-up" sequences.

Figure 15A:
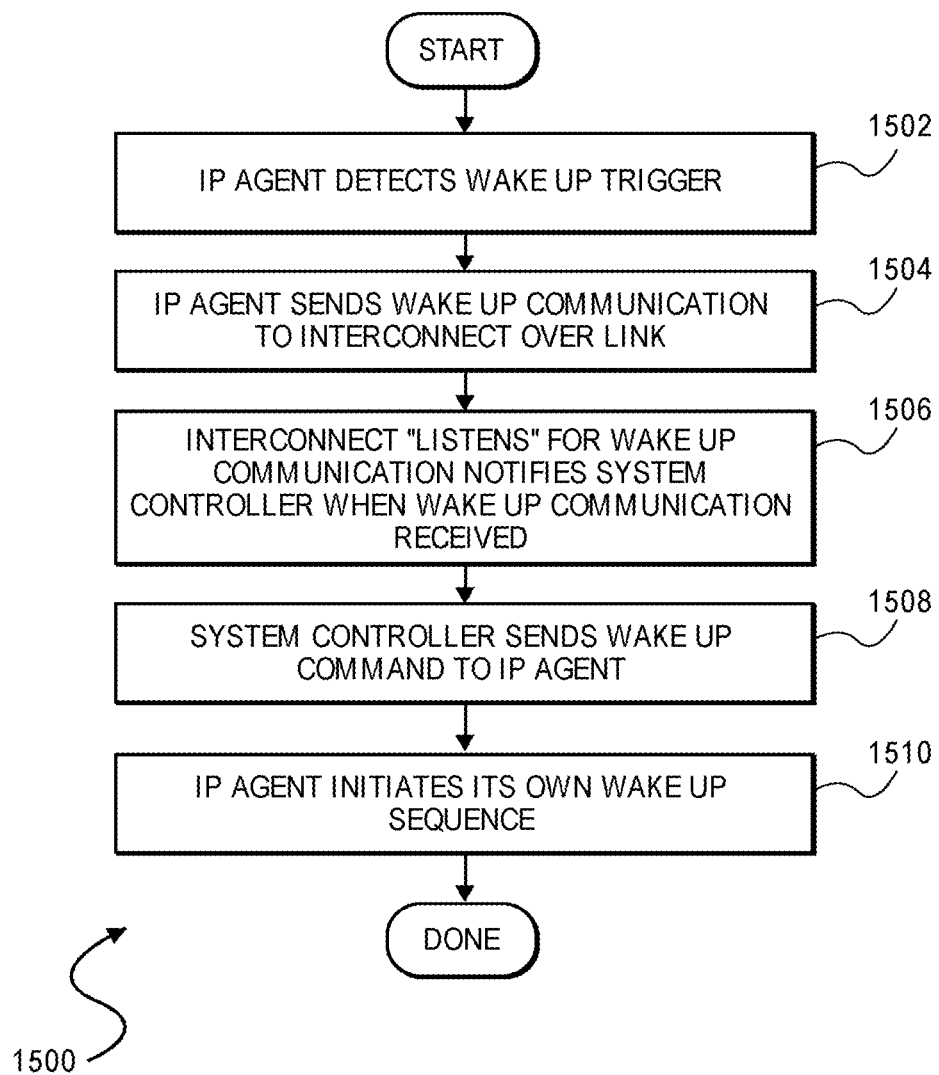
FIG. 15A-15D are flow diagrams illustrating various "wake-up" sequences for an IP agent.

Referring to FIG. 15A a flow diagram 1500 illustrating an agent-initiated "wake-up" sequence is illustrated. In this embodiment, the wake up sequence is initiated by the IP agent, but implemented through the system controller 804.

In step 1502, an IP agent 14 in an inoperable state detects a wake-up trigger event. Although an IP agent may be powered down or "off", it may remain at least partially functional in the sense that it maintains the ability to detect when a wake-up trigger occurs. The wake-up trigger may include a number of different types of events. For example, it could be an internal timer that causes the IP agent 14 to wake-up after a predetermined period of time, or it can be an event external to the SoC 800, such as another device that wishes to communicate with the IP agent 14. In step 1504, the IP agent sends a "wake-up" communication over its link 803 to the interconnect 802. Again, although the link is in the quiescent state when its corresponding IP agent 14 is in an inoperable state, it is capable of transmitting the wake-up signal to the interconnect 802.

In step 1506, the interconnect 802 is configured to "listen" for a wake-up signal from an inoperable IP agent. If the signal is detected, the interconnect 802 notifies the system controller 804.

In step 1508, the system controller 804 may send command(s) over the interconnect 802 for the IP agent 14 to initiate its wake-up sequence.

In step 1510, the IP agent initiates its wake-up sequence in response to the command(s).

With the embodiment described above, the IP agent 14 asks the system controller to initiate the wake-up sequence. In response to a wake-up command from the system controller, the IP agent initiates its own wake-up sequence. The system controller is therefore aware of the status of the IP agent as it emerges from its inoperable state and becomes visible on the interconnect 802.

Figure 15B:
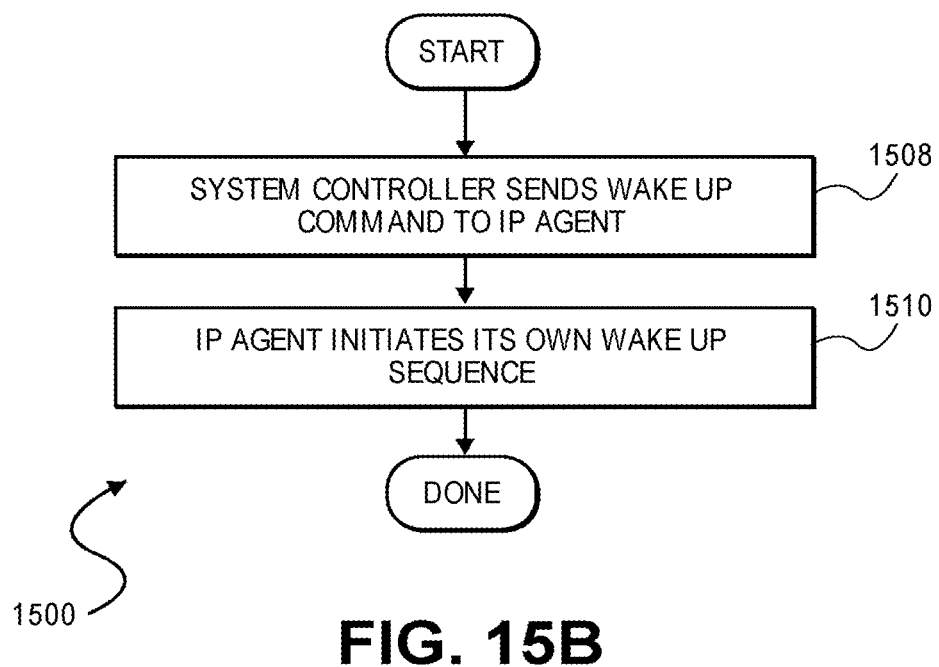

FIG. 15B shows the sequence when the system controller 804 initiates a wake-up of an IP agent 14. With this sequence, the system controller 804 sends wake up command(s) to the IP agent in step 1508, and in response, the IP agent initiates its own wake up sequence in step 1510. In a variation of this embodiment (not illustrated), the wake up may be initiated off the SoC 800 via the system controller 804. When the system controller 804 receives the command(s), the above described process is initiated.

Figure 15C:
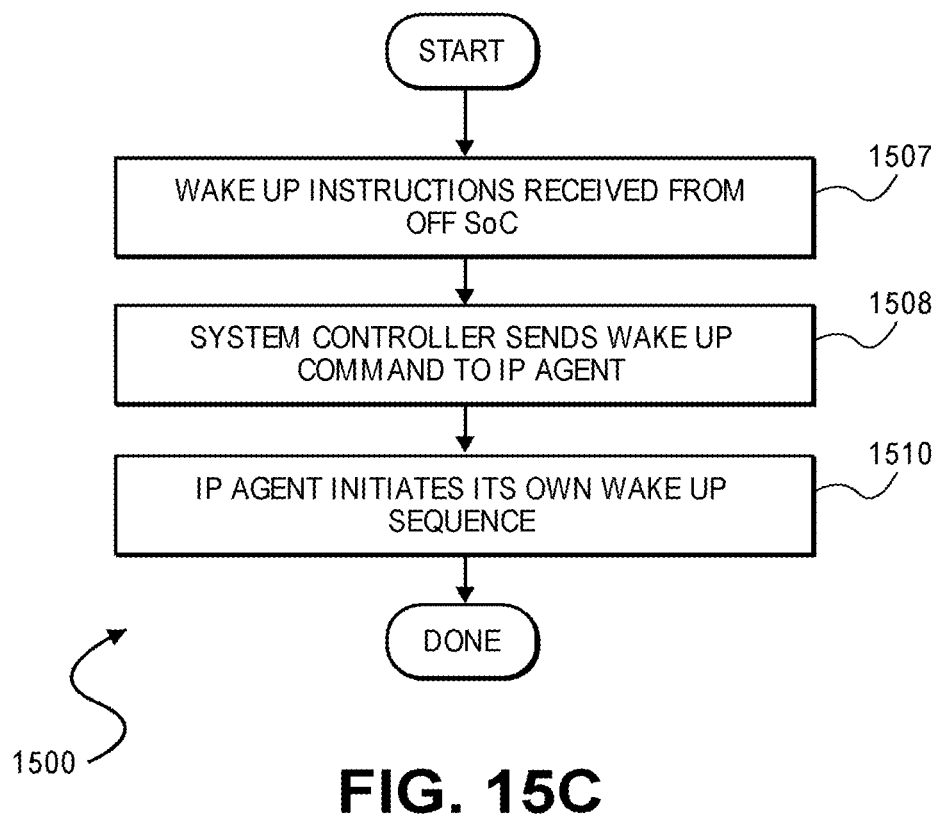

FIG. 15C shows the sequence when the wake up command for an IP agent 14 that originates off the SoC 800 and is implemented through the system controller 804. With this sequence, the system controller 804 receives the command in step 1512. In response, the system controller sends a wake up command to the IP agent in step 1508, and in response, the IP agent initiates its own wake up sequence in step 1510. With direct wake up from off the SoC 800, the command is provided directly to the IP agent 14 via its hard-wire input. In response, the IP agent initiates its own wake up sequence.

Figure 15D:
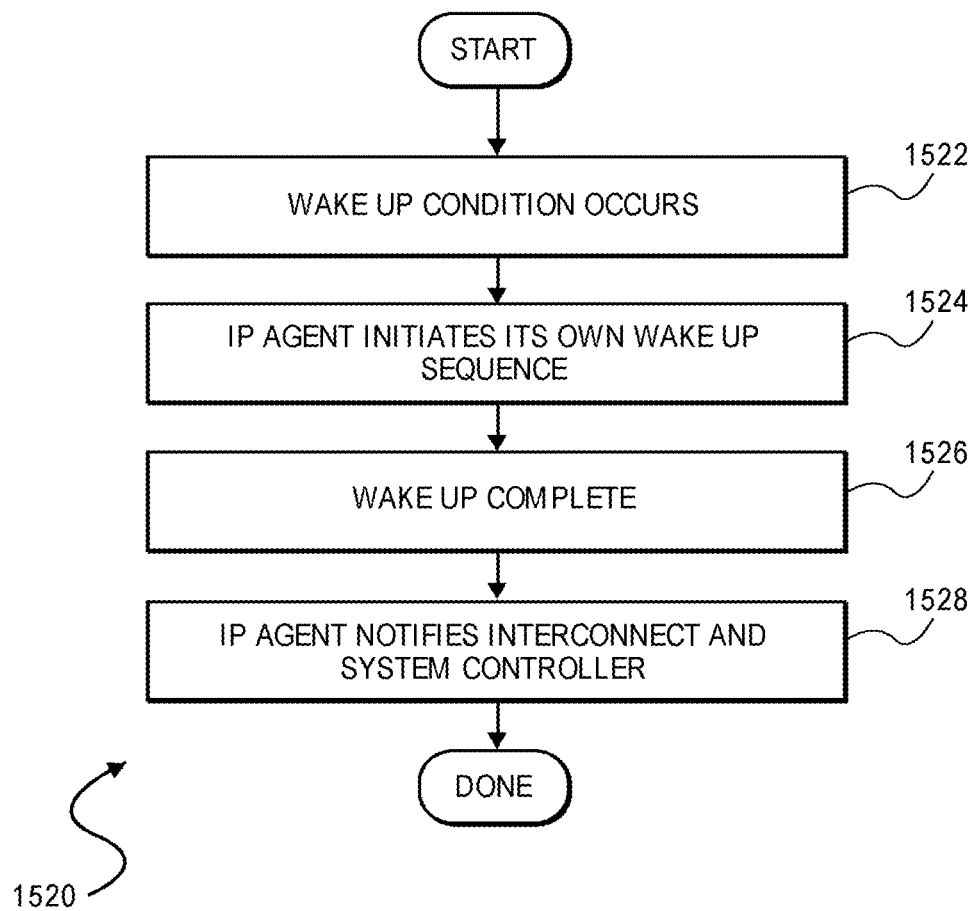

Referring to FIG. 15D, a flow diagram 1520 illustrating an IP agent initiated and implemented wake up sequence is illustrated. In this embodiment, a wake up condition, such as any of those noted above, occurs in step 1522. In response, the IP agent initiates its own wake up sequence in step 1524. In step 1526, the wake up sequence completes. Thereafter, in step 1528, the IP agent notifies the interconnect 802 and the system controller 804, either directly or through the interconnect 802, of its awoken status.

In the above examples, sequences for transitioning a single IP agent into one of the above-described low power modes was described for the sake of simplicity. In actual embodiments, multiple IP agents 14 on an SoC may be powered down concurrently. If two or more are powered down at or around the same time, each would independently undergo one the above described sequences, depending on the mode.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein, but may be modified within the scope and equivalents of the appended claims.

What is claimed is:

1. A System on a Chip (SoC), comprising:
an interconnect for handling transactional traffic between a plurality of circuit subsystems on the SoC, the interconnect comprising a port, the plurality of circuit subsystems including a first circuit subsystem configured to initiate a subsystem wake-up sequence to enable the first circuit subsystem to resume normal operation, the subsystem wake-up sequence involving:
the first circuit subsystem sending a wake-up request signal over a link to the interconnect in response to a wake-up trigger event while the first circuit subsystem is in an inoperable state and the link is in a quiescent state, the wake-up trigger event comprising an event related to the first circuit subsystem;
the interconnect, in response to detecting the wake-up request signal from the first circuit subsystem, notifying a system controller, the system controller in an awake state, that the wake-up request signal was detected; and
the system controller, in response to the notifying, sending a command over the interconnect to the first circuit subsystem, the command directing the first circuit subsystem to initiate the subsystem wake-up sequence to exit the inoperable state.

2. The SoC of claim 1, further comprising:
a quiescent manager arranged to place the link in the quiescent state by:
instructing the first circuit subsystem to stop generating transactions;
waiting for outstanding transactions to complete and placing the link in the quiescent state responsive to determining that transactions generated by the first circuit subsystem are complete; and
causing the first circuit subsystem to initiate a sequence to enter the inoperable state.

3. The SoC of claim 1, further comprising:
a power manager arranged to place the first circuit subsystem into the inoperable state by performing at least one of:
shutting off a clock associated with the first circuit subsystem; or
reducing a power supply to the first circuit subsystem.

4. The SoC of claim 1, wherein the inoperable state comprises a lower power state in which the first circuit subsystem is provided a lower voltage than a standard operating voltage of the first circuit subsystem.

5. The SoC of claim 1, wherein the inoperable state comprises an off state in which the first circuit subsystem is provided no voltage or a clock of the first circuit subsystem is disabled.

6. The SoC of claim 1, wherein the interconnect is configured to act as a proxy on behalf of the first circuit subsystem when the first circuit subsystem is in the inoperable state, the interconnect acting as the proxy after the interconnect drains transactions that the first circuit subsystem has already issued by one or more of:
preventing new transactions from being initiated; or
waiting for outstanding transactions to complete.

7. The SoC of claim 6, wherein the interconnect is configured to act as a proxy of behalf of the first circuit subsystem until the subsystem wake-up sequence has concluded and the first circuit subsystem has resumed normal operation.

8. The SoC of claim 1, wherein the wake-up trigger event includes one or more of the following:
a reception, by the first circuit subsystem, of a communication from a source external to the SoC;
a determination, by the first circuit subsystem, of an expiration of a predetermined time period;
a reception, by the first circuit subsystem, of an instruction from the system controller; or
a reception, by the first circuit subsystem, of a valid transaction targeting the first circuit subsystem in the inoperable state.

9. A System on a Chip (SoC), comprising:
an interconnect for handling transactional traffic between a plurality of shared resources on the SoC, the plurality of shared resources directly connected to the interconnect at one or more ports; and
a link connecting a shared resource of the plurality of shared resources to the interconnect, the shared resource configured to initiate a subsystem wake-up sequence when in an inoperable state in response to a wake-up trigger event, the subsystem wake-up sequence arranged to enable the shared resource to resume normal operation and involves:
the shared resource sending a wake-up request signal over the link to the interconnect in response to the wake-up trigger event, while the shared resource is in the inoperable state and the link is in a quiescent state, the wake-up trigger comprising an event related to the shared resource;
the interconnect, in response to detecting the wake-up request signal from the shared resource, notifying a system controller, the system controller in an awake state, that the wake-up request signal was detected; and
the system controller, in response to the notifying, sending a command over the interconnect to the shared resource, the command directing the shared resource to initiate the subsystem wake-up sequence to exit the inoperable state.

10. The SoC of claim 9, further comprising:
a quiescent manager arranged to place the link in the quiescent state by:
instructing the shared resource to stop generating transactions;
waiting for outstanding transactions to complete and placing the link in the quiescent state responsive to determining that transactions generated by the shared resource are complete; and
causing the shared resource to initiate a sequence to enter the inoperable state.

11. The SoC of claim 9, further comprising:
a power manager arranged to place the shared resource into the inoperable state by performing at least one of:
shutting off a clock associated with the shared resource; or
reducing a power supply to the shared resource.

12. The SoC of claim 9, wherein the inoperable state comprises a lower power state in which the shared resource is provided a lower voltage than a standard operating voltage of the shared resource.

13. The SoC of claim 9, wherein the inoperable state comprises an off state in which the shared resource is provided no voltage or a clock of the shared resource is disabled.

14. The SoC of claim 9, wherein the interconnect is configured to act as a proxy on behalf of the shared resource when the shared resource is in the inoperable state, the interconnect acting as the proxy after the interconnect drains transactions that the shared resource has already issued by one or more of:
preventing new transactions from being initiated; or
waiting for outstanding transactions to complete.

15. The SoC of claim 14, wherein the interconnect is configured to act as a proxy of behalf of the shared resource until the subsystem wake-up sequence has concluded and the shared resource has resumed normal operation.

16. The SoC of claim 9, wherein the wake-up trigger event includes one or more of the following:
   a reception, by the shared resource, of a communication from a source external to the SoC;
   a determination, by the shared resource, of an expiration of a predetermined time period;
   a reception, by the shared resource, of an instruction from the system controller; or
   a reception, by the shared resource, of a valid transaction targeting the shared resource in the inoperable state.

17. A method comprising:
   determining, by a circuit subsystem that is in an inoperable state, that a wake-up trigger event has occurred, the wake-up trigger event comprising an event related to the circuit subsystem;
   responsive to determining that the wake-up trigger event has occurred, transmitting, by the circuit subsystem, over a link that is in a quiescent state, and to an interconnect that couples the circuit subsystem to one or more other circuit subsystems, a wake-up request signal;
   detecting, by the interconnect and over the link, the wake-up request signal;
   responsive to detecting the wake-up request signal, transmitting, by the interconnect and to a system processor in an awake state, the wake-up request signal to enable the system processor to communicate commands associated with a subsystem wake-up sequence; and
   responsive to the interconnect transmitting the wake-up request signal to the system processor, sending, by the system processor, a command over the interconnect to the circuit subsystem to initiate the subsystem wake-up sequence to direct the circuit subsystem to exit the inoperable state.

18. The method of claim 17, wherein the wake-up trigger event comprises one or more of the following:
   receiving, by the circuit subsystem, a communication from a source external to a System on a Chip that includes the circuit subsystem;
   determining, by the circuit subsystem, an expiration of a predetermined time period;
   receiving, by the circuit subsystem, instructions from the system processor; or
   receiving, by the circuit subsystem, a valid transaction targeting the circuit subsystem in the inoperable state.

19. The method of claim 17, further comprising:
   responsive to determining that the wake-up trigger event has occurred:
      transmitting, to the circuit subsystem, a standard voltage that is larger than a lower voltage provided to the circuit subsystem in the inoperable state; or
      transmitting; to the circuit subsystem, a command effective to increase a clock speed of the circuit subsystem to a higher clock speed than used during the inoperable state.

20. The method of claim 17, wherein:
   the interconnect acts as a proxy on behalf of the circuit subsystem when the circuit subsystem is in the inoperable state, the interconnect acting as the proxy after the interconnect drains transactions that the circuit subsystem has already issued; and
   the method further comprises, responsive to receiving, by the interconnect, the wake-up request signal, disabling the interconnect from acting as a proxy on behalf of the circuit subsystem.

* * * * *